(12) United States Patent
Singh

(10) Patent No.: US 6,204,860 B1
(45) Date of Patent: Mar. 20, 2001

(54) METHOD AND APPARATUS FOR GEOMETRIC MODEL DEFORMATION USING WIRES

(75) Inventor: Karan Sher Singh, Toronto (CA)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/109,903

(22) Filed: Jul. 2, 1998

(51) Int. Cl.[7] ..................................................... G06F 15/00
(52) U.S. Cl. ............................................................ 345/433
(58) Field of Search ................................... 345/435, 440, 345/433, 113, 114

(56) References Cited

U.S. PATENT DOCUMENTS 5,659,625 * 8/1997 Marquart .............................. 382/118
5,687,259 * 11/1997 Linford ................................. 382/294
5,850,463 * 11/1997 Horii .................................... 382/118

OTHER PUBLICATIONS

Alan H. Barr, "Superquadrics and Angle–Preserving Transformations", IEEE, Jan. 1981, pp. 11–23.
John E. Chadwick et al., "Layered Construction for Deformable Animated Characters", Computer Graphics, vol. 23, No. 3, Jul. 1989, pp. 243–252.
Jules Bloomenthal et al., "Interactive Techniques for Implicit Modeling", AMC, 1990, pp. 109–116.
Ron MacCracken et al., "Free–Form Deformations With Lattices of Arbitrary Topology", Computer Graphics Proceedings, 1996, pp. 181–188.
Thomas W. Sederberg et al., "Free–Form Deformation of Solid Geometric Models", Dallas, vol. 20, No. 4, Aug. 1986, pp. 151–160.
Brian Wyvill et al., "Animating Soft Objects", The Visual Computer, 1986, pp. 235–242.

* cited by examiner

Primary Examiner—Phu K. Nguyen

(57) ABSTRACT

A system that defines a wire curve deformation primitive with a free-form parametric curve associated with the closest points to the curve on a surface of a model. The wire curve includes a radius influence defining the points on the object which will be deformed. A scale factor determines the amplitude of the scaling or point movement that is caused by the wire curve. A blending function of the wire curve defines the transition form deformed regions of the object to undeformed regions of the object. The wire curve can have associated with it holder curves defining the domain of deformation about an object caused by one or more wires. A holder curve holds the points of the object in place. Locators are used to define different parameters values along the wire curve. Changes in parameter values around the locators are accomplished by interpolation. Deforming includes preprocessing steps as well as deformation stage operations.

21 Claims, 48 Drawing Sheets

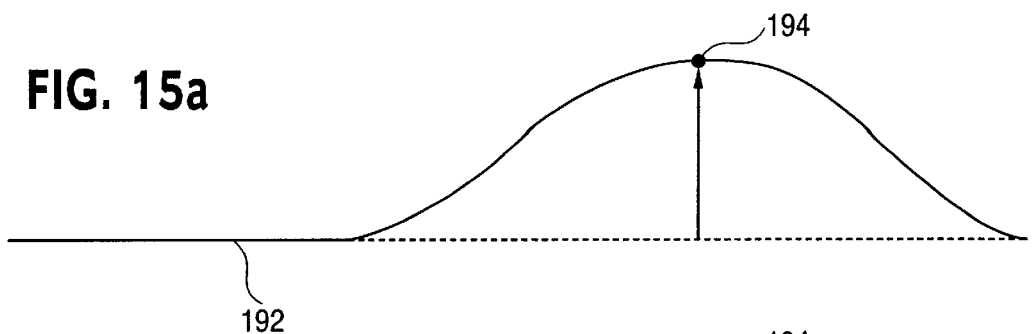
FIG. 15a
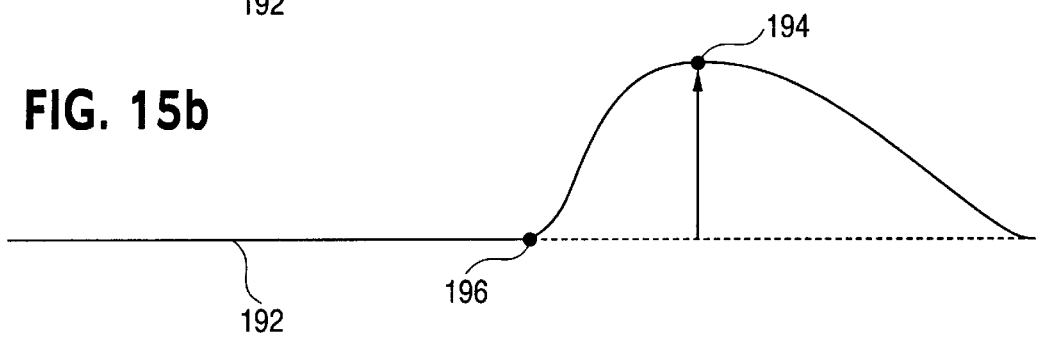
FIG. 15b
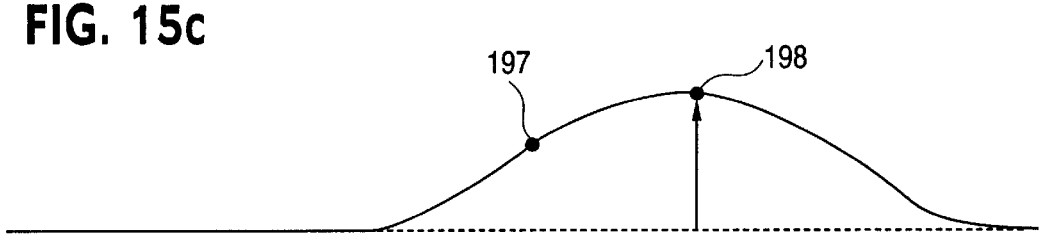
FIG. 15c
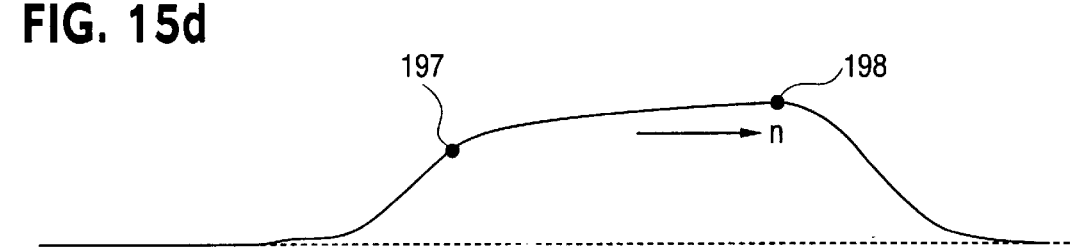
FIG. 15d
FIG. 19
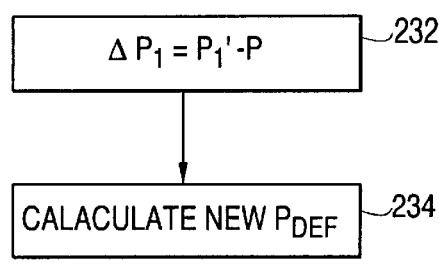

METHOD AND APPARATUS FOR GEOMETRIC MODEL DEFORMATION USING WIRES

BACKGROUND OF THE INVENTION

1. Field of the Invention

The present invention is directed to using wires as curves that effect object or model deformation and, more particularly, to a system where wires, independent of the characteristics of the object, can be used to give definition to an object and shape its deformable features.

2. Description of the Related Art

The modeling and animation of deformable objects is an active area of research. Free-form deformations (FFDs) and its variants are popular and provide a high level of geometric control over the deformation. These approaches typically involve the definition and deformation of a lattice structure of control points. By deforming the space defined by the lattice any object within the space is also deformed. An object embedded within the lattice is deformed by defining a mapping from the object to the undeformed lattice. The point in space in the deformed lattice is the deformation imparted to the point. The user deals with a level of detail dictated by the density of the control lattice. While very useful for coarse-scale deformations of an object, this technique can be difficult to use for finer-scale deformations, since a very dense control lattice and customized control lattice shape may be required. To perform fine control the "resolution" of the lattice needs to approach that of the portion of an object that is to be deformed. Manipulating a dense control lattice is often harder than deforming the underlying geometry directly, and arbitrarily shaped lattices (other than a box shape) can be cumbersome to construct.

What is needed is a deformation mechanism that is easy to control.

Axial deformations provide a more compact representation in which a one-dimensional primitive such as a line segment or curve is used to define an implicit global deformation. Axial deformations also use the notion of a reference curve and a closest point computation. The axial deformation technique relates two Frenet frames attached at the closest point on the curve and the corresponding point on the reference curve. The deformation imparted to a point is a portion of a transformation from the reference curve's Frenet frame to the Frenet frame on the deformed curve. The proportion is based on an interpolation of the closest distance of the point to the reference curve between two cutoff radii. However, axial deformations cannot provide a coarse-scale representation of the object surface, or provide an easily manipulated deformation primitive that highlight and track the salient deformable features of the object. In axial deformations as well as lattice based deformations the underlying geometric model of the object needs to be apparent to the user separate and apart from the line segment or curve used to define the axial deformation primitive.

What is needed is a primitive that provides a coarse-scale representation of the object surface and a primitive that can be directly manipulated while highlighting and tracking the deformable features of the object and in which the underlying geometric model of the object need not be apparent to the user.

SUMMARY OF THE INVENTION

It is an object of the present invention to provide a modeling primitive based on a wire.

It is another object of the present invention to provide a deformation primitive that is independent of the complexity of the underlying object model.

It is also an object of the present invention to provide an additional primitive, called a holder or domain curve, that define or restricts the domain of deformation about an object of a wire.

It is a further object of the invention to provide for the integration of the deformations from multiple wires without causing aggregate artifacts.

It is an object of the present invention to allow surfaces to be stitched together seamlessly.

It is an additional object of the present invention to provide a system that allows surfaces to be easily wrinkled.

It is an object of the present invention to allow flexible skeletons to be animated efficiently.

The above objects can be attained by a system that defines a wire curve deformation primitive that includes a free-form curve associated with a surface of a model. The wire curve includes a region of influence about the free-form curve that defines what points on the object will be deformed. A scale factor determines the amplitude of scaling or point movement caused by the wire curve. A blending function of the wire curve defines the transition from deformed regions of the object to undeformed regions of the object.

The wire curve can have domain or holder curves associated therewith that define the domain of deformation about an object caused by one or more wires by holding the points of the object in place. The holder curve can hold or keep a deformed point from moving as well as hold or keep an undeformed point from moving. Locators associated with a wire curve are used to define different parameters values along the wire curve.

The process of deforming relevant parts of an object include preprocessing steps of determining which points will be influenced by the wire curve calculating an influence function for each point. As the curve is manipulated, the deformation stage processing includes scaling, rotating and translating the points to be deformed.

When multiple wires deform a particular region of an object, the deformations caused by the individual wires are determined. These deformations are algebraically combined with a bias weighting toward larger deformations.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 15a–15d depict holder curve action.

FIG. 19 is a flow chart for combination of wire effects by integration.

DESCRIPTION OF THE PREFERRED EMBODIMENTS

The present invention is directed to a deformation primitive called a "wire curve" (or wire) which is a freeform curve provided independent of the object but which can be used to effect geometric object deformation. Another primitive called a "domain curve" or "holder curve" (or holder) defines the domain of deformation about an object caused by a wire curve. A wire together with a collection of domain or holder curves provides a new basis for an implicit modeling primitive. The fundamental attraction of wires relates to their aggregate behavior as well as their ability to give a coarse-scale representation of a geometric object. Wires directly reflect object geometry and can be created through sketching. A single wire is a useful direct manipulation deformation tool. The combination of wires and holders or domain curves provides a way to outline the shape of an implicit volume in space. The aggregation of deformations the resulting from multiple wires, holders and their interaction with each other also provides useful deformation techniques. The invention is particularly useful in animating figures with flexible articulations, modeling wrinkled surfaces and stitching geometry together.

Figure 1A:
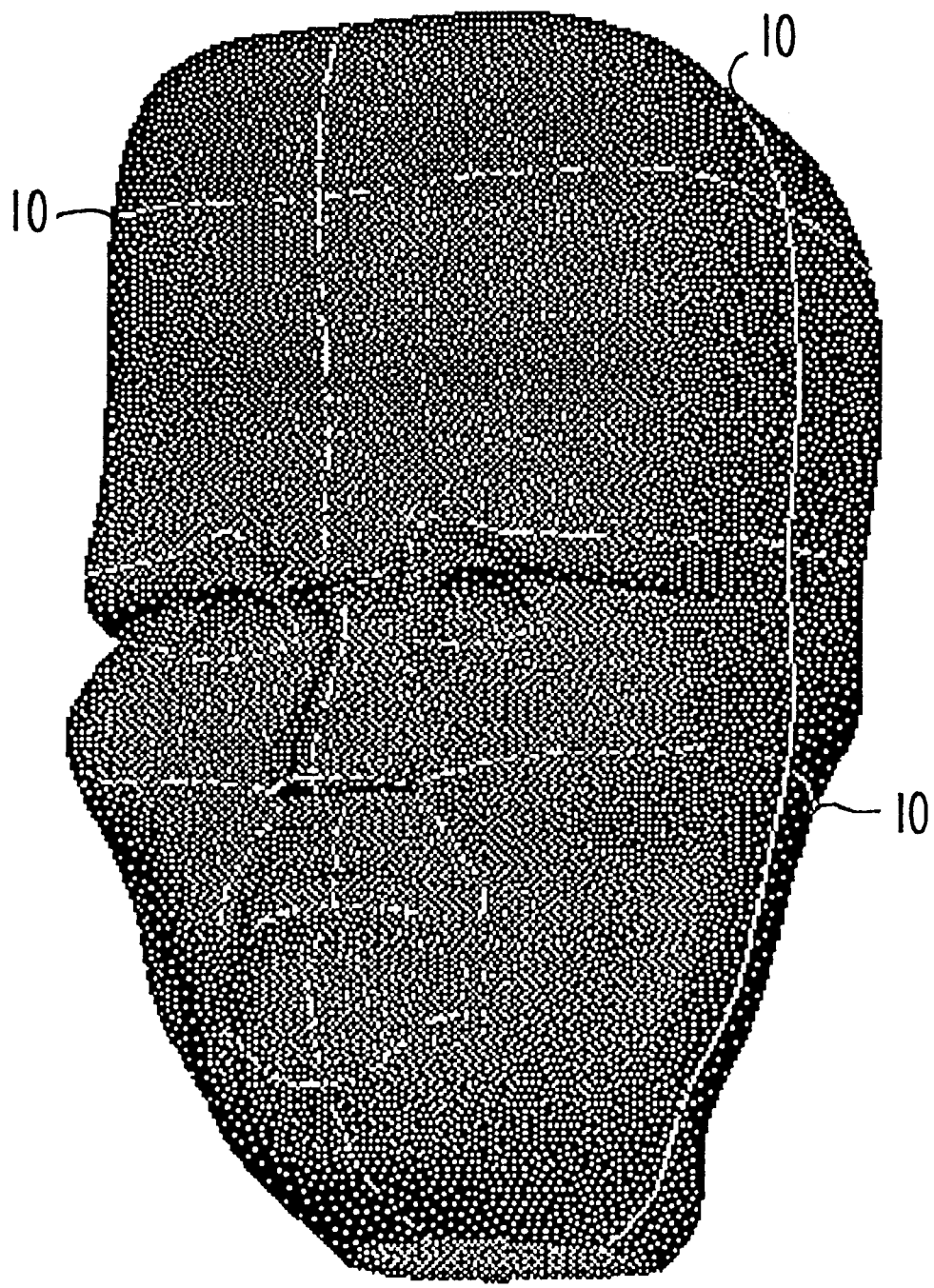
FIGS. 1a–1c depict wires associated with an object or model of a face.
Figure 1B:
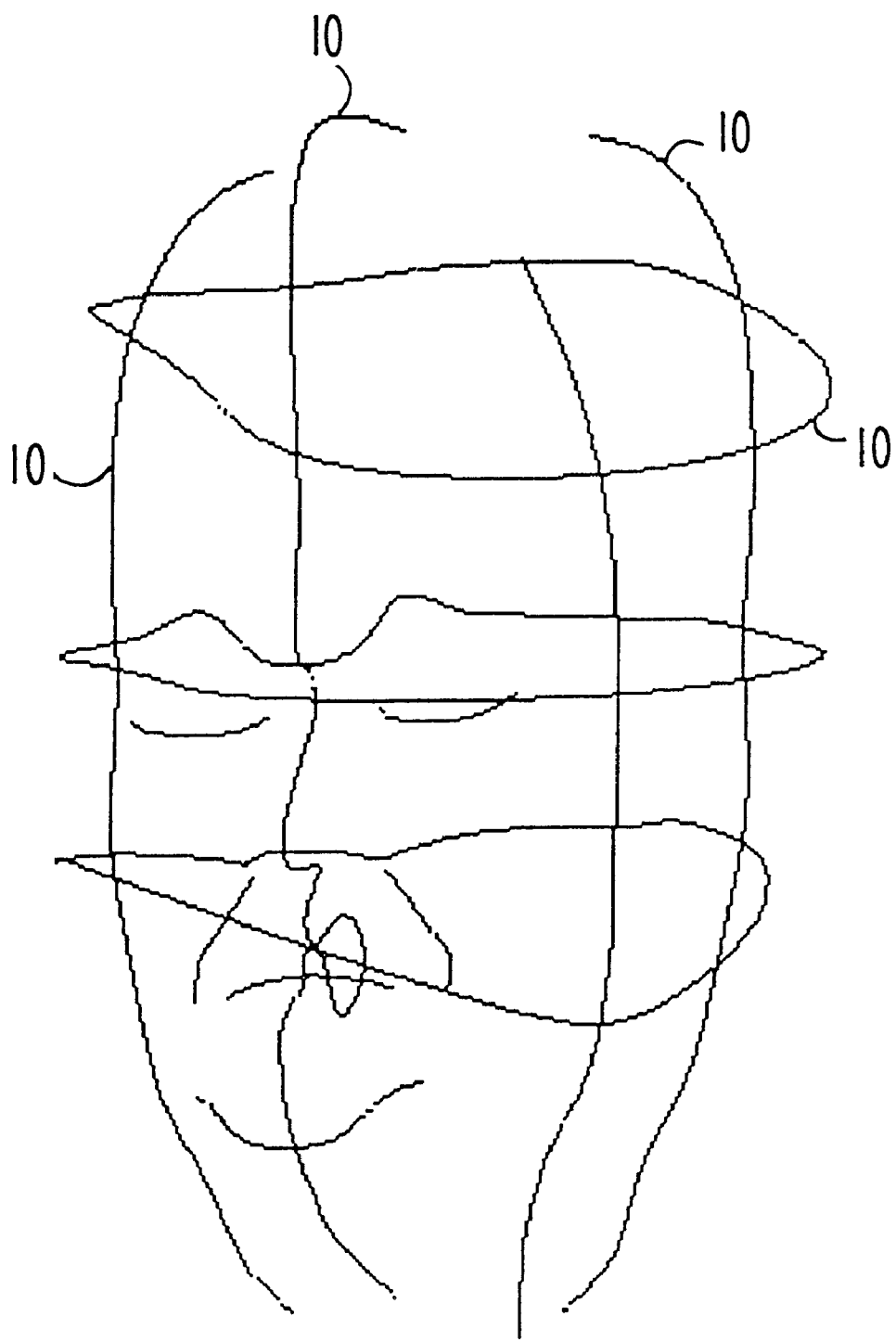
Figure 1C:
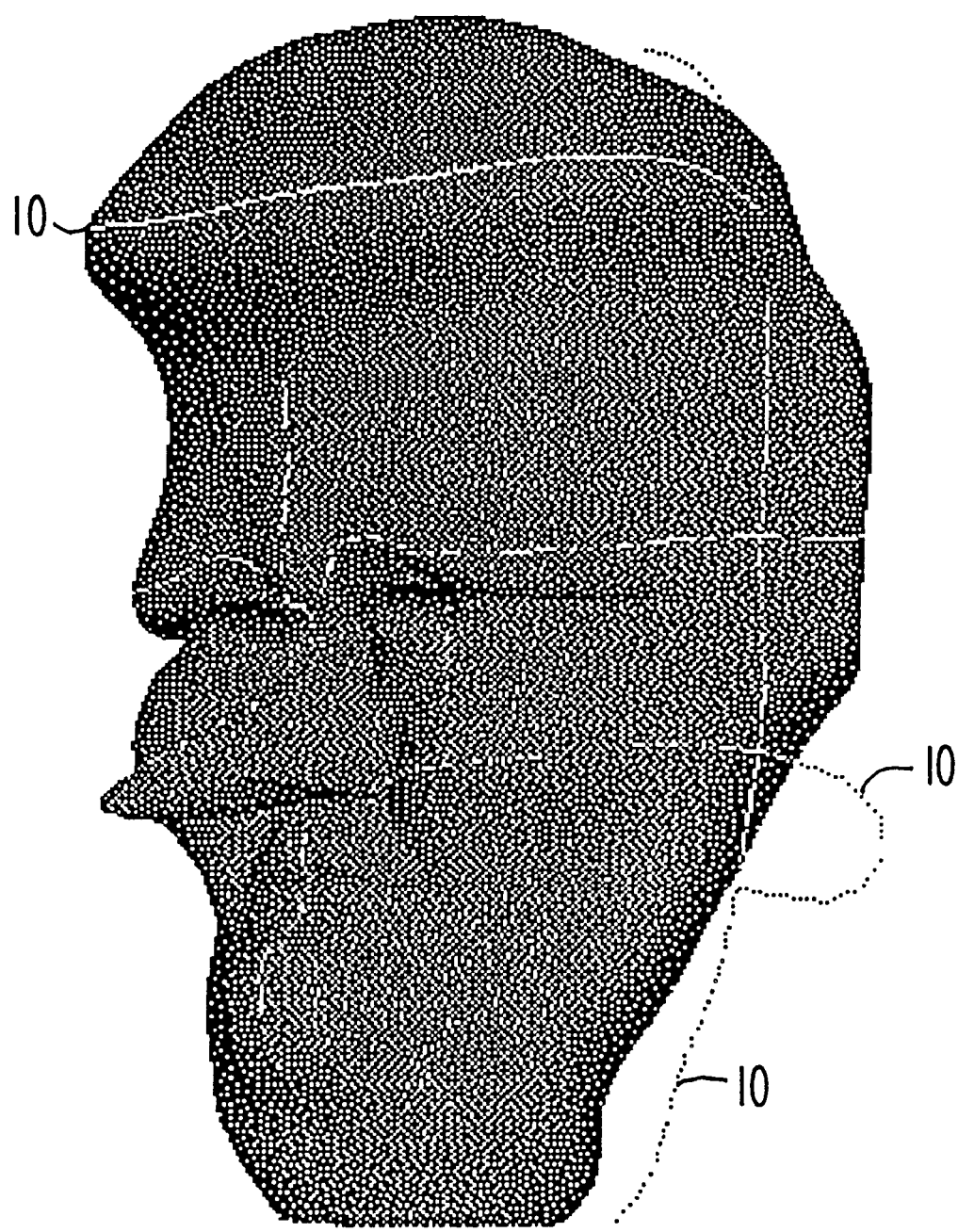

Wire deformations, in accordance with the present invention, may be likened to a constructive sculpting approach in which the physical wires of an armature provide definition to an object and control its deformable features. As in sculpture, the wire curves themselves give a coarse approximation to the shape of the object being modeled as depicted in FIGS. 1a–1c. FIG. 1a illustrates wires 10 "on" a model or object, FIG. 1b depicts only the wires showing how they can coarsely represent the model and FIG. 1c depicts a deformation of the model accomplished by changing the shape of the wires 10. A wire deformation is independent of the complexity of the underlying object model while easily allowing finer-scale deformations to be performed as either object or deformation complexity increases. In fact, an animator can interact with a deformable model, namely the wires, without ever having to deal directly with the object representation itself. Wires can control varying geometric representations of the same object and can even be reused on different objects with similar deformable features. This makes them particularly well-suited to facial animation.

As previously mentioned a wire is independent of the model or object being deformed by the wire. A wire is constructed in the vicinity of the object and needs to be bound to the object. Once a wire is bound to the object, any manipulation of the wire is reflected as a deformation of the object. Wires have applications to motion capture, modeling and animation of wrinkled surfaces, animation of flexible articulated structures, and generally to feature-based geometric modeling.

A wire is a curve whose manipulation deforms the surface of an associated object in the proximity of the curve. It is important for the wire paradigm that no deformation be imparted to the object solely as a result of the association of the object to the wire curve. A wire is defined as a tuple <W,$W_{ref}$,s,r,f>. The definitions of the components of this tuple are discussed below.

W and $W_{ref}$ are free-form parametric curves that can be any of a number of curves typically associated with animation, such as a spline curve, a Bezier curve, etc. or just a related set of arbitrary points that define a parametrized curve. $W_{ref}$ is a congruent copy of the curve W and is called a reference curve. For convenience $W_{ref}$ will be abbreviated as R. Manipulation of W results in a change between W and R, which is used along with s (discussed below) to define the deformation. W is independent of the object, that is, it can be located anywhere within the coordinate frame of the object. However, it is preferable that W be located in proximity to or on the surface of the object. W can also take any shape. However, it is preferable that it have the shape of the surface of the object associated with the wire. That is, the curve W could be called an object surface curve. It is also preferable that a curve, such as a cubic Bezier curve, that is easy to control and manipulate be used. A cubic Bezier curve of the preferred type is defined, using four control points, as follows:

$$P(u)=P0*(1-u)^3+P1*3*u*(1-u)^2+P2*3*u^2*(1-u)+P3*u^3 \quad (1)$$

Figure 2:
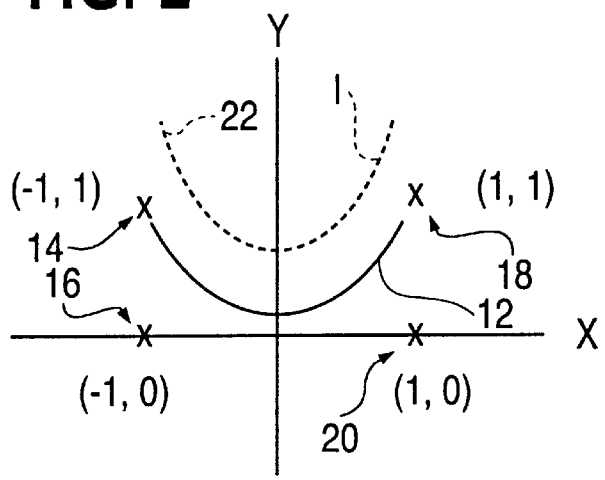
FIG. 2 depicts a typical curve that can be used as a parameter of a wire.
Figure 3:
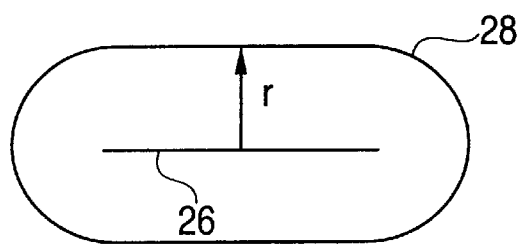
FIG. 3 illustrates an influence region around a wire.
Figure 4:
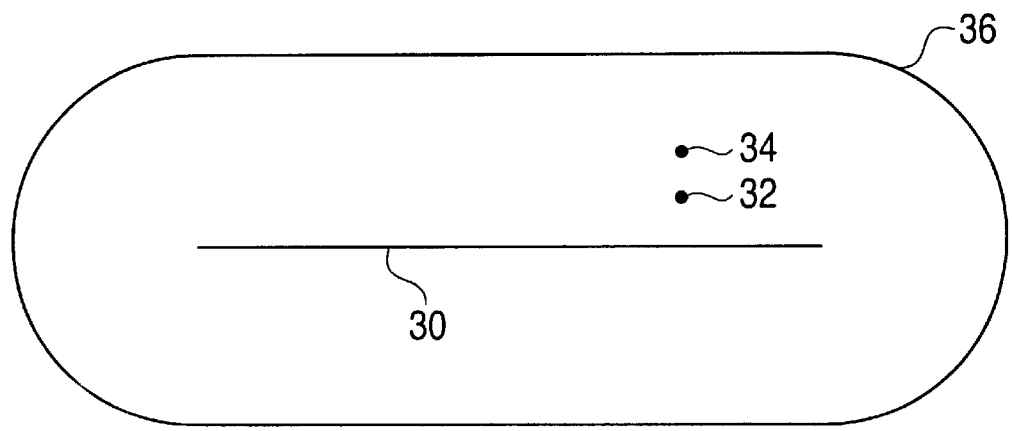
FIG. 4 illustrates scaling of points within the influence region of a wire.

Points P(u) on the curve are defined for u in the range [0,1], where P0, P1, P2 and P3 are the four control points. As an example assume that the curve is a two dimensional (2D) curve in a plane with the control points P0=(−1,1); P1=(−1,0); P2=(1,0); and P3=(1,1) which would result in a curve 12 with control points 14, 16, 20 and 18 that looks somewhat like a parabola, as shown in FIG. 2. One might think that this looks somewhat like the end of a persons nose or chin as seen from above and could be used to control the deformation of such facial features. Note that a wire typically has three dimensions and two are being used in this example for simplicity of explanation. The dashed line in FIG. 2 could represent the surface of the object 22 (say a nose) and the curve 12 can be separate from the object 22 as shown or actually on the surface of the object which is preferred. The curve W is placed into the space of or on the object using the conventional curve drawing capabilities of conventional drawing or animation packages.

r is a scalar value defining an offset surface of a region, domain or radius of influence around a curve 26, such as depicted in FIG. 3. This influence region 28 is depicted in two dimensions around a curve 26 in FIG. 3. As can be seen, the influence extends completely around the wire 26, such that a straight wire in three dimensions will have an influence region that looks somewhat like a sausage. If the curve W is located sufficiently far from the surface of the object such that r does not include any of the points of the object, no deformation will result.

s is a scalar or scale factor that controls radial scaling around or translation with respect to the curve 30, such as depicted in FIG. 4. For example, if a point 32 is within the influence of the wire and the radial scaling factor is +2, the point would move during deformation to a new point 34 at most twice it's original distance from the curve 30. If the point is in a position such that it will encounter the boundary 36 of the influence region when scaled, the point can move outside the boundary. The scaling magnitude is also affected by the blending function discussed below.

The scalar function f in three dimensional space is sometimes referred to in implicit function related literature as a blending or density function. Normally, f is at least $C^1$ and monotonically decreasing with f(0)=1, f(x)=0 for $x \geq 1$ and f'(0)=0, f'(1)=0.

A blending function could be any function that smooths a transition from one region to another. A suitable and simple blending function f that satisfies these requirements is:

$$f(x) = (x^2 - 1)^2 \quad (2)$$

where x is in the range [0,1]. However, for all x>=1,f(x)=0.

This data structure tuple <W,R,s,r,f> defines a volume about curve W bounded by an offset surface at a distance r from the curve. Effecting a deformation of an object requires instantiating and appropriately positioning a wire tuple. The deviation between an instantiated wire and its original position helps to define the deformation.

Let C(u) be a space curve, parametrized without loss of generality by $u \in [0,1]$. For any point P in three dimensional space let $P_C \in [0,1]$ be the parameter value that minimizes the Euclidean distance between point P and curve C(u). If there is more than one minimum, $P_C$ is arbitrarily defined to be the parameter with the smallest value. In most cases, this is an effective choice, but it can be overly simple in geometrically delicate situations, which we discuss later. Given f and r as defined above, for any point P and curve C, we define F(P,C) as the influence function of C on P as:

$$F(P, C) = f\left(\frac{\|P - C(p_C)\|}{r}\right) \quad (3)$$

From the properties of f it is clear that F(P,C) varies from zero for $\|P-C(p_C)\| \geq r$ (points on and outside the offset volume defined by C and r), to F(P,C)=1 when $\|P-C(p_C)\|=0$ (P lies on C). F(P,C) defines the influence that a curve C has on a point P. This is the usual function definition for implicitly defined offset shapes, and it will be used below in defining the semantics of the deformation.

Wire deformations are simply a pointwise function mapping of points in three dimensional space. As such, the only restriction placed on the representation of an object to be deformed is that it be characterized as a discrete set of points. This could be a set of control vertices for free form surfaces, a set of vertices in a polymesh, or an unstructured set of points in space.

The computation of the deformations associated with a wire can be divided into two stages: a pre-processing stage that is performed before any deformation takes place and a deformation stage. The preprocessing stage is typically performed once and an object is bound to a set of wires. In the deformation stage any manipulation of a wire affects a deformation of the object. As with any deformation, a wire deformation is a pointwise function mapping three dimensional space onto three dimensional space. For each object O, $P_0$ is the point-based representation of the object to which the wire deformations will be applied. $P_0$ typically contains all the points needed to construct or approximate an objects surface. $P_0$ could be a set of control vertices for freeform surfaces, a set of vertices in a polymesh or an unstructured set of points in three dimensional space.

Figure 5:
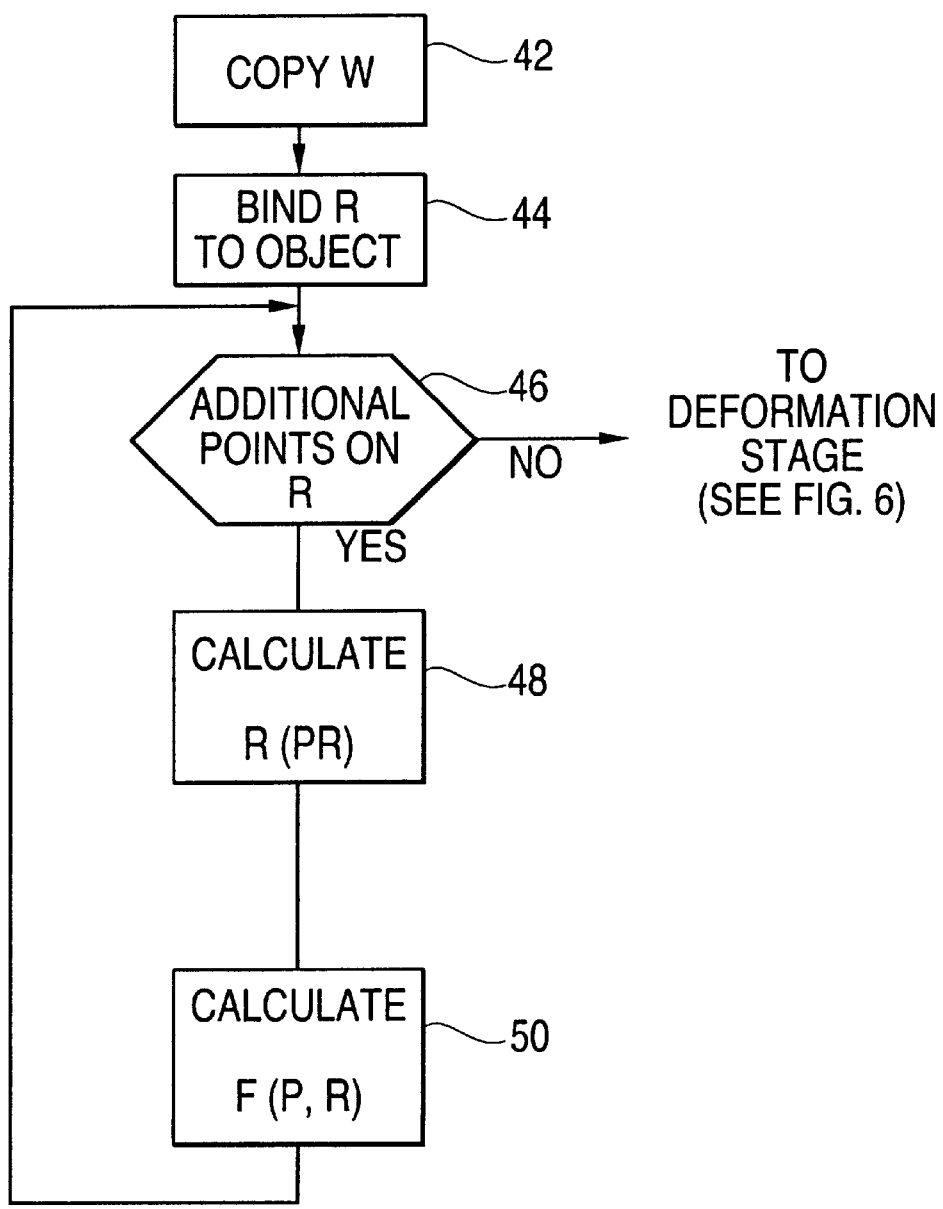
FIG. 5 is a flowchart of the flow of the preprocessing stage.

The preprocessing stage starts with making 42 a copy R or instance of the curve W as depicted in FIG. 5. The wire <W,R,s,r,f> is then bound 44 to the object by finding the closest point on the object O to each point on the curve R. When an object is bound to a wire, the parameters $p_R$ and F(P,R) are computed for every point $p \in P_0$. The process then enters a loop where calculations of $p_R$ and F(P,R) are made for all points on the object O and a loop test 46 determines whether to continue the calculations. Next, the system calculate 48 $R(p_R)$ and then calculates $F(P,C)=f((\|P-C(p_C)-\|/r)$ (see equation 3) substituting W for C and $R(p_R)$ for $C(p_C)$ for every point P in $P_0$, that is, for every point on the wire R that has a corresponding point in the object O. Only points on the object within the offset volume (within r) of the wire (points P with F(P,R)>0) are deformed. The deformation, which is scaled by F(P,R), depends on the manipulation of the wire curve W and the value of s. The deformation at point P is related to the deviation of the closest point on the reference curve $R(p_R)$ from a corresponding point on wire curve W.

As an example, assume we wish to calculate F(P,R) where R is this curve defined in equation 1 above and shown in FIG. 2. $p_R$ i.e. the parameter value for the point on R that is closest to P is u=0.5. Plugging in values for u, $P_0 \ldots P_3$ into equation 1 we get the point on the curve that is closest to (0,0) to be (0,0.25). Assume for this example that the values of r and s are 1. Note since the distance to the closest point above is 0.25<r, that is, it is within the region of influence, the point will be deformed upon manipulation of the wire. When the blending function f set forth in equation 2 is used the result is $F(P,R)=f(\|P-(0,0.25)\|/r)=f(0.25)=225/256=0.87890625$. This is the end of the preprocessing step for this point. The process continues for all the other points on the object.

Figure 6:
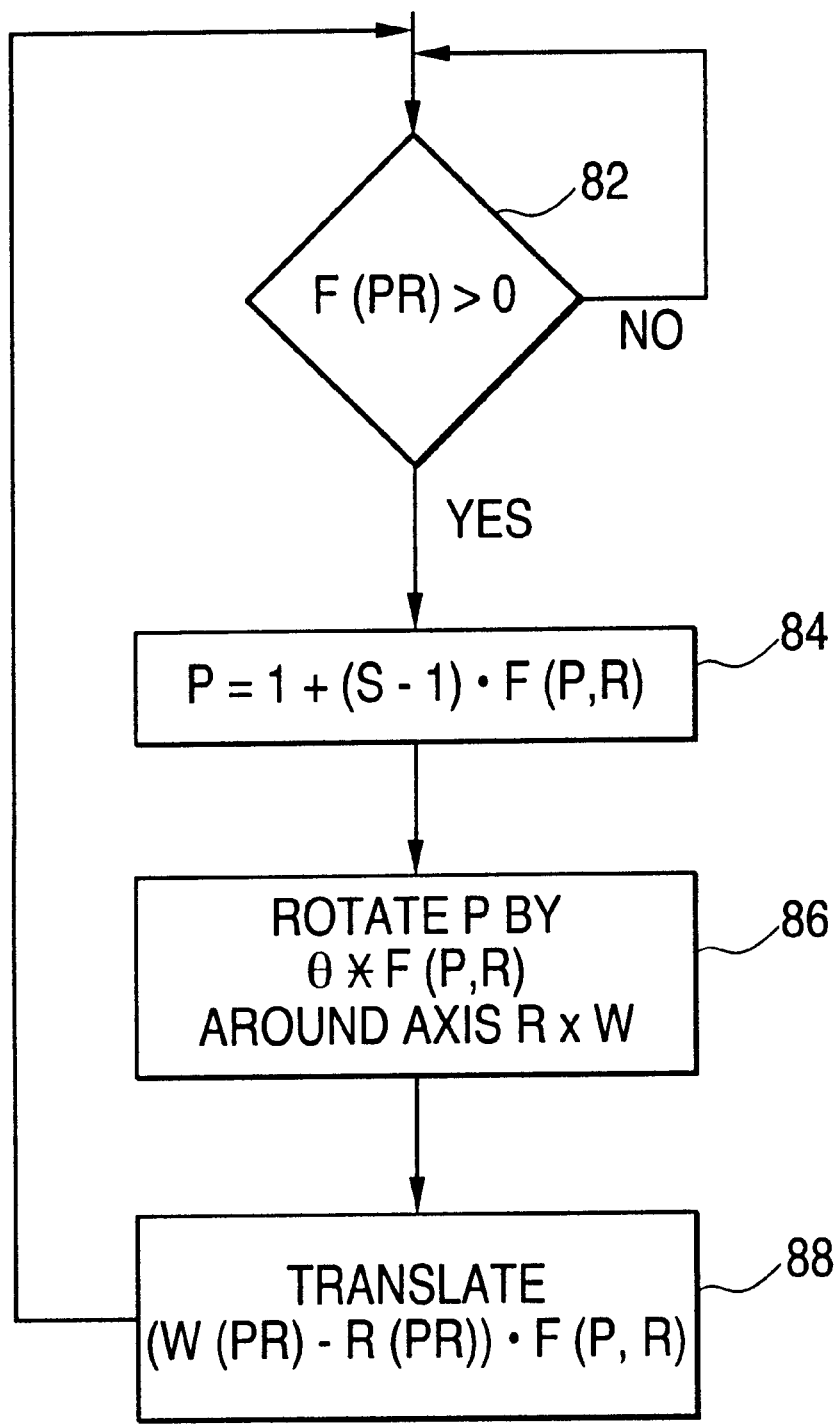
FIG. 6 is a flowchart of the flow of the deformation stage processing.

The precalculations discussed above identify the region of the object that will be deformed. When the wire curve W is manipulated, or conventionally moved using conventional curve movement functions of a drawing or animation package, during the deformation stage the operations depicted in FIG. 6 are performed. First, for every point P of the undeformed object 0 a test 82 is performed to determine whether F(P,R)>0. If so, P is scaled 84 by $P_s=P+(P-R(p_R)) \cdot (1+(s-1) \cdot F(P,R))$ with respect to point $R(p_R)$. In the next step C'(u) is defined as the tangent vector to curve C at u, and $\theta$ is defined as the angle between $W'(p_R)$ and $R'(p_R)$. The step involves rotating the point resulting from the scaling operation Ps, by the modulated angle $\theta \cdot F(P,R)$, around the tangential axis W'($p_R$)xR'($p_R$), about point R($p_R$). This provides a screw-like deformation. The last step 88 of the deformation stage for each point is to add the translation (W($p_R$)−R($p_R$))F(P,R) to the result of the rotation. The resulting deformed point is thus $P_{def}$=$P_r$+(W($p_R$)−R($p_R$))·F(P,R).

Figure 7:
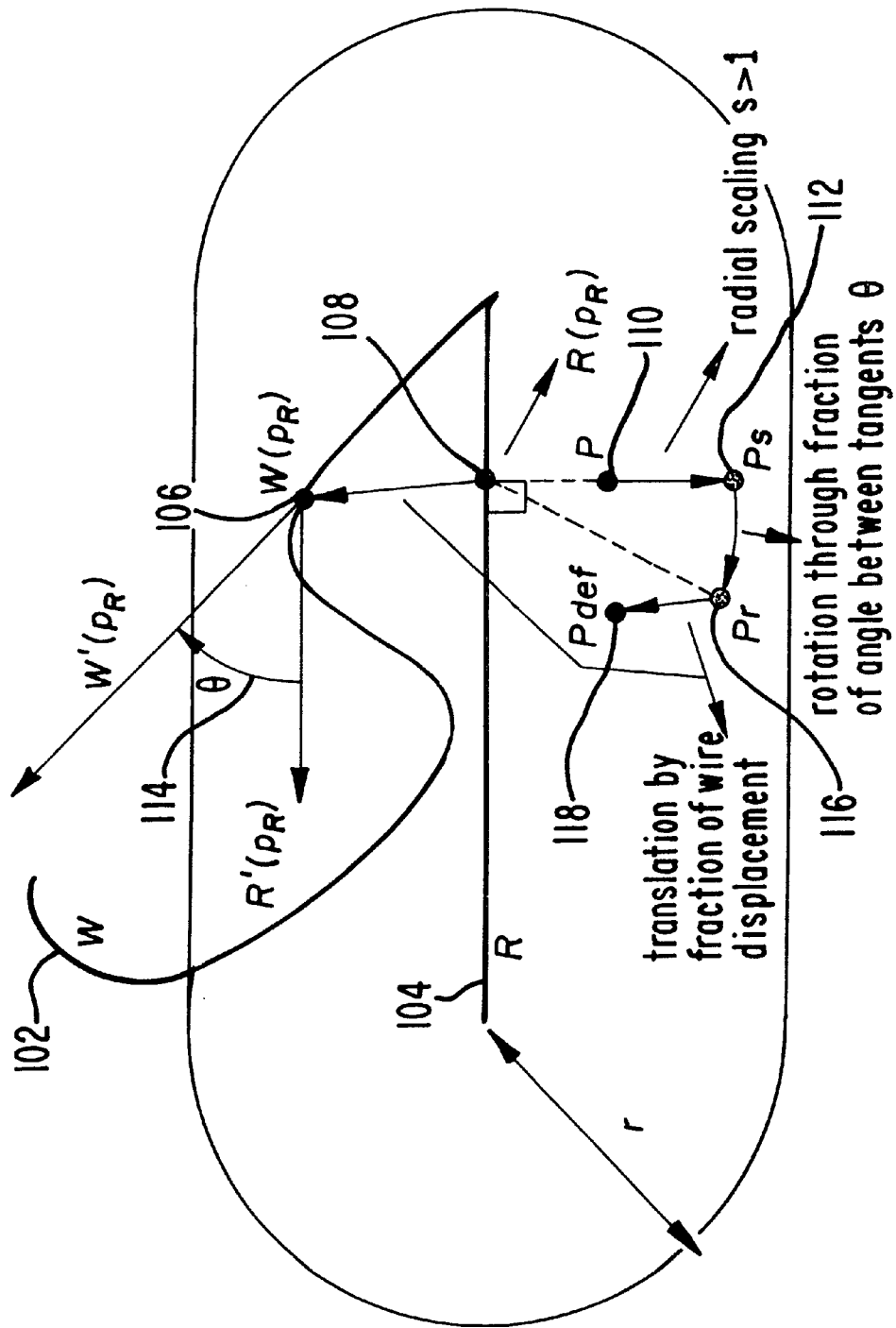
FIG. 7 illustrates the motion of a point in the various steps of the deformation stage processing.

The above steps are depicted visually in FIG. 7. In this figure we have wire 102 and instance or reference copy 104. The region of influence r is shaded. The point 106 on wire W corresponds to point 108 on the copy R and the point 110 on the object which will be deformed. Note the point 110 is within the influence region. In the scaling step the point 110 becomes the point 112. In the rotation step the angle 114 between the tangent to curve 104 and the tangent to curve 102 is determined and used to control the rotation producing point 116. The point 116 becomes the final deformed point 118 as the result of the translation.

From the above discussion it can be seen that when the curve W is only translated or uniformly scaled as an entire curve there is no rotational component but a translational component. When the scale factor s=1 there is no scaling. When there is no rotation and no translation of W but the scale factor s is set at other than the default value, there is only scaling and no rotation or translation.

For a numerical example, assume that the curve 12 of FIG. 2 is rotated by 90 degrees about (1,0), so that the curve 12 looks somewhat like a left parentheses "(". The new positions of the control points for W are P0=(2,2), P1=(1,2), P2=(1,0) and P3=(2,0). In the deformation calculation for point P=(0,0) there is no change due to the scaling step 84 because the scale factor s=1. In the rotation step 86 the tangent vector at parameter u for equation 1 is given by:

$$P'(u)=P0*-3*(1-u)^2+P1*(3*(1-u)^2-6*u*(1-u))+P2*(-3*u^2+6*u*(1-u))+P3*3*u^2 \quad (4)$$

The normalized tangent vectors at u=0.5 are thus calculated by plugging into equation 4.

$$R'=(1,0) \quad (5)$$

and $$W'=(0,1) \quad (6)$$

We thus rotate P about an axis (1,0)×(0,1) coming out of the plane, around the closest point on R=(0,0.25) through the angle F(P,R)*θ (where θ is the angle between R' and W' and θ in this case is 90 degrees). Rotating (0,0) about (0,0.25) by 0.879*90=79.11 degrees, we get the deformed point (−0.2455,0.203). For the translation step 88, the point on the rotated curve W at u=0.5 is (10/8,1)=(1.25,1) and we now add in a translation equal to ((1.25,1)−(0,0.25))*F(P,R) to the deformation result of the rotation step which is (−0.2455, 0.203). The resulting final point is (−0.2455,0.203)+(1.25, 0.75)*0.879=(0.8533,0.8623), which ends the deformation step calculations for this point.

One can see the resulting point is intuitively deformed by noting that had F(P,R) been 1 (a scenario where the point exactly tracks the curve) the deformed point would have been (1,1). The attenuated deformation shown by the result (0.8533,0.8623) reflects the value of F(P,R)=0.879.

To turn this into a 3D example there only needs to be added a third dimension z to all the points something within the skill in the art.

The wire of the invention has the following beneficial properties. The object is not deformed when it is first associated with the wire: since R coincides with W, no rotation or translation is applied. Thus, for a default scale parameter s=1, no deformation is applied to the object.

Points on the object outside the offset surface volume of the wire curve (points P with F(P,R)=0) are not deformed regardless of the value of s. This is because F(P,R) scales each step of the deformation. Points on the object that are on or bound to the wire curve, when the object is associated with the wire, track the wire curve precisely. For a point P on the undeformed object that coincides with a point on the reference curve R, R($p_R$) is identical to P and thus F(P,R)= f(0)=1. The scale and rotation have no effect as they are applied with respect to R($p_R$). P thus moves to P+(W($p_R$)− R($p_R$)) or the point W($p_R$) on the wire curve W. The deformation of points on the object between those on the wire curve and those outside its realm of influence is smooth and intuitive. The factor F(P,R) controls the attenuation of the deformation, varying from precise tracking for points on the wire curve to no deformation at or beyond the offset volume boundary. The properties of the blending function f largely control the smoothness properties and behavior of the influence function R(P,R). For s=1 the cross-section of the deformed object surface in a plane perpendicular to the wire curve at a point closely resembles the profile of f (see FIG. 9). Manipulating f while preserving its constraints thus provides intuitive control over the shape of the deformed object surface.

Figure 8:
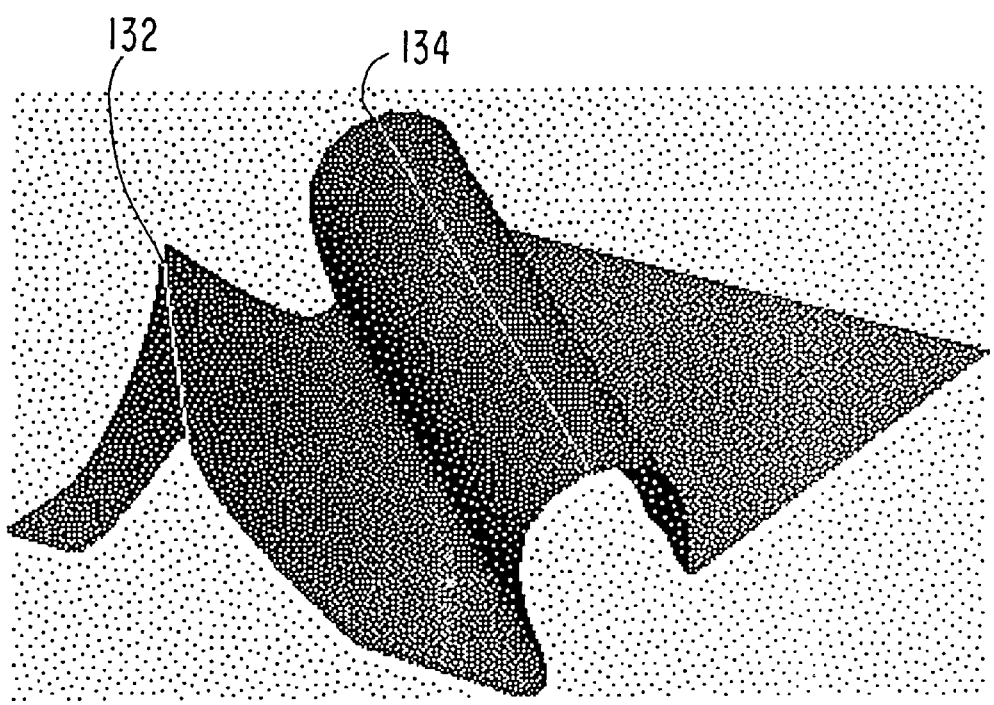
FIG. 8 illustrates the effects of varying the scale factor.

FIG. 8 shows how simply reducing s on a first wire 132 and increasing it on a second wire 134 provides "sucking" or "bulging" control over the deformation.

Figure 9:
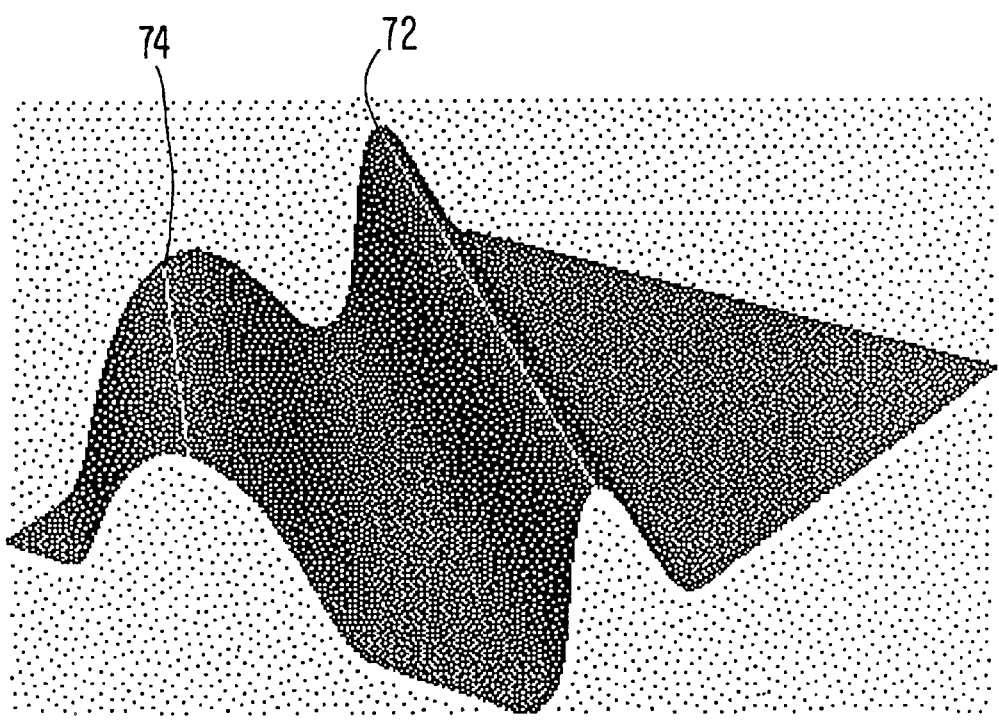
FIG. 9 illustrates the effects of varying the region of wire influence.

FIG. 9 shows how a first wire 72 with a larger r affects a larger region of the object than a second wire 74 with a smaller r, where the other deformation parameters are kept identical. The deformation at a point P is related to the point R'($p_R$) and a corresponding point on the wire W. A direct correspondence based on parameter value ($p_R$) is preferred but other correspondence functions such as one based on arc-length parameterization can be used as well.

Figure 10A:
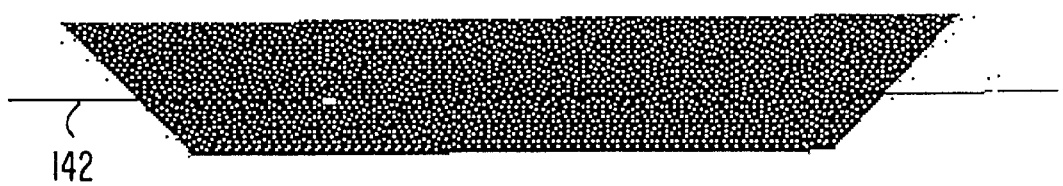
FIGS. 10a–10c depict a non-linear transformation being incorporated into the deformation processing.
Figure 10B:
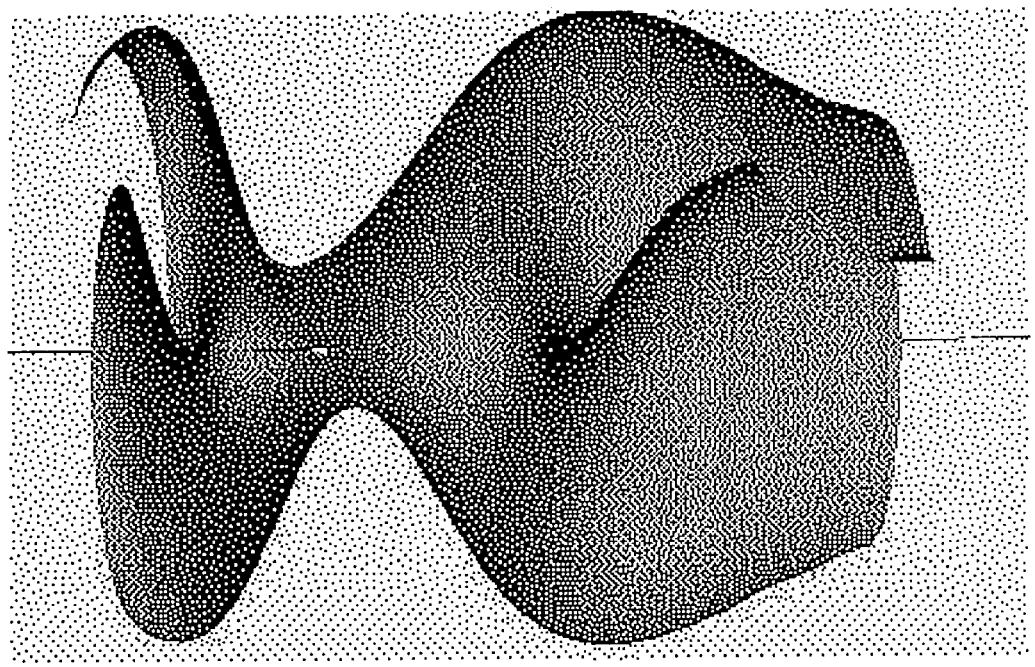
Figure 10C:
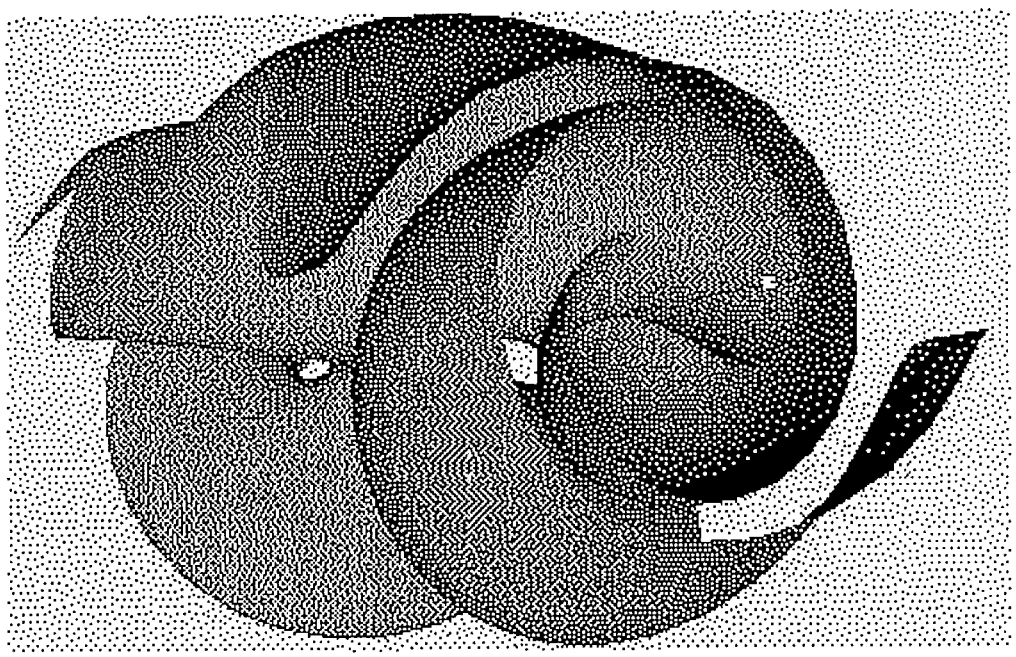

While axial and wire deformations share some similarities, wires have three advantages. First, the separation of the scale, rotation and translational aspects of the deformation for the wire, as set forth in the deformation algorithm, provides a user with selective control through the ability to turn off or attenuate each effect and a better feel for the resulting deformation than the superposed transformation of a Frenet frame. Second, simple non-linear transformations can be incorporated seamlessly into the deformation algorithm at the appropriate point. For example, as seen in FIGS. 10a–10c, an interpolated twist around the wire 142 can implemented by rotating the point around the axis along the reference curve R'($p_R$) by a specified angle as part of the rotational step of the deformation stage. Third, using an implicit function to control the spatial influence of the wire on the deformed object makes the technique accessible to more general implicit surface animation techniques. The discussion below concerning locators and holder or domain curves will describe how implicit functions can be overlaid by a user to determine what parts of the deformed objects are affected and by how much.

Figure 11A:
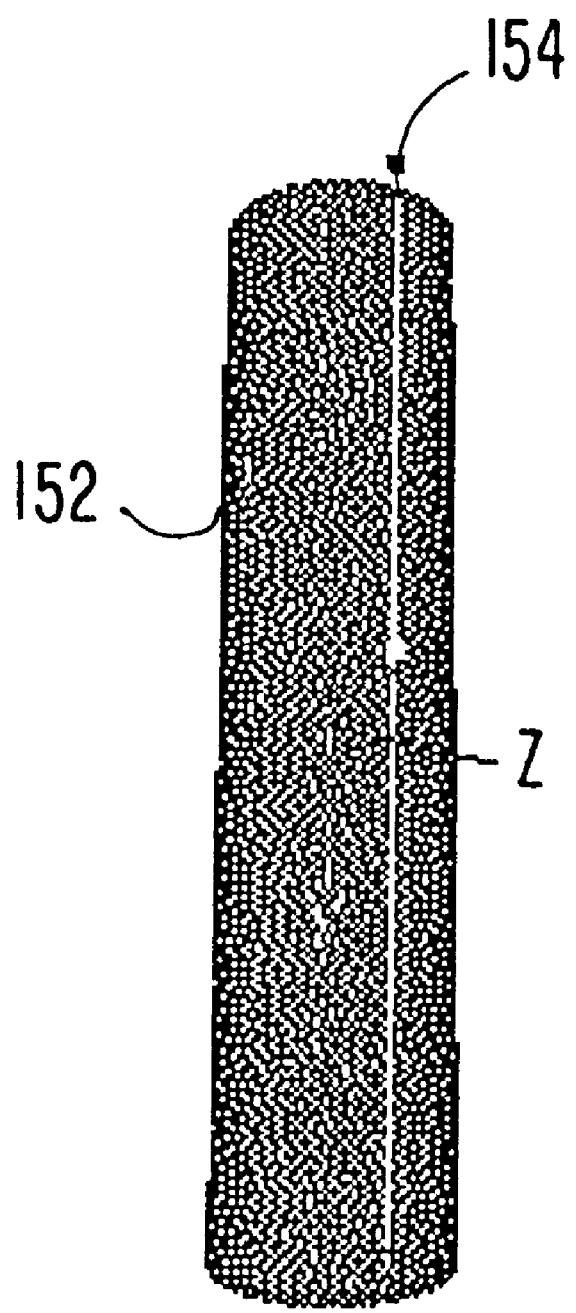
FIGS. 11a–11f depict the results of varying wire parameters.
Figure 11B:
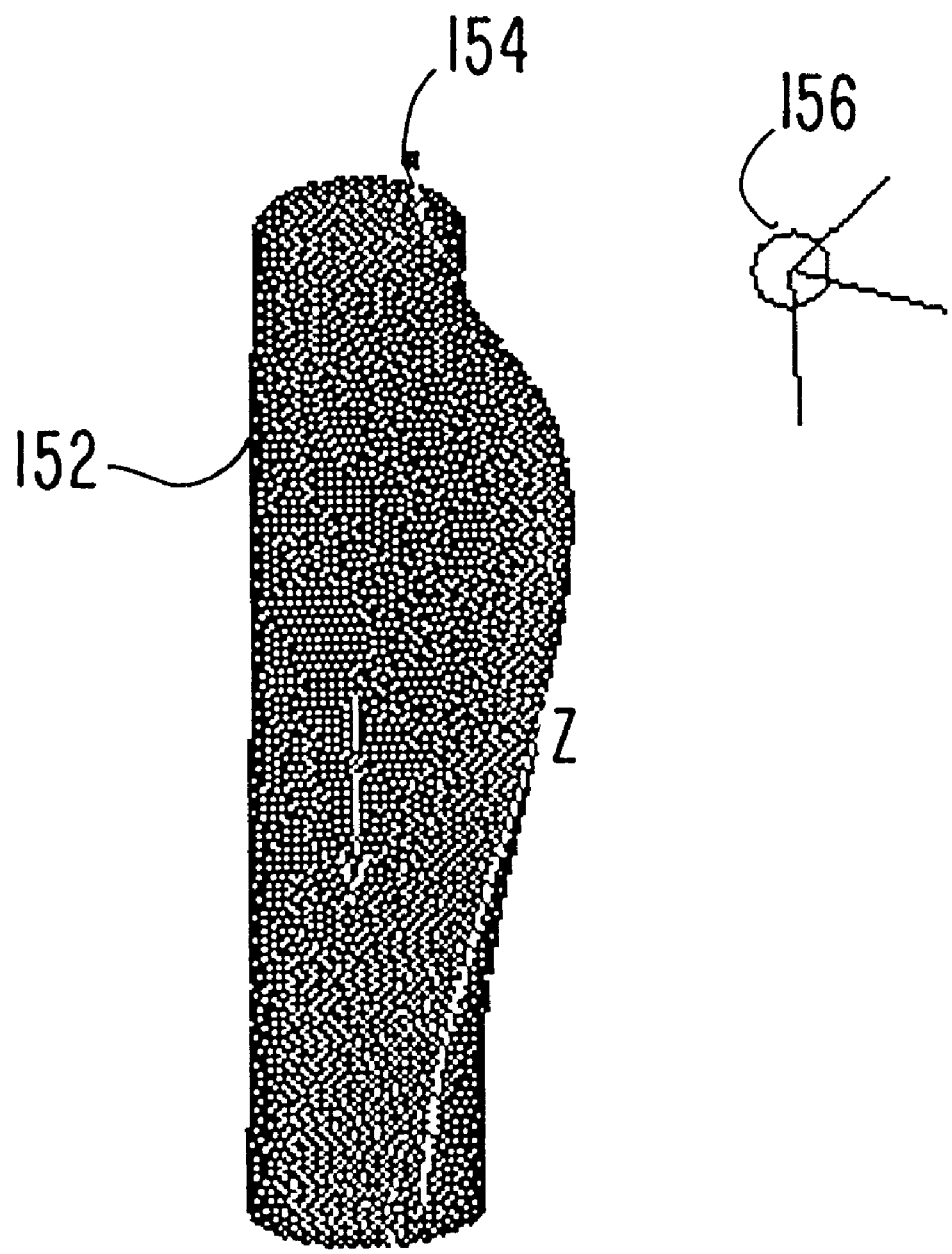
Figure 11C:
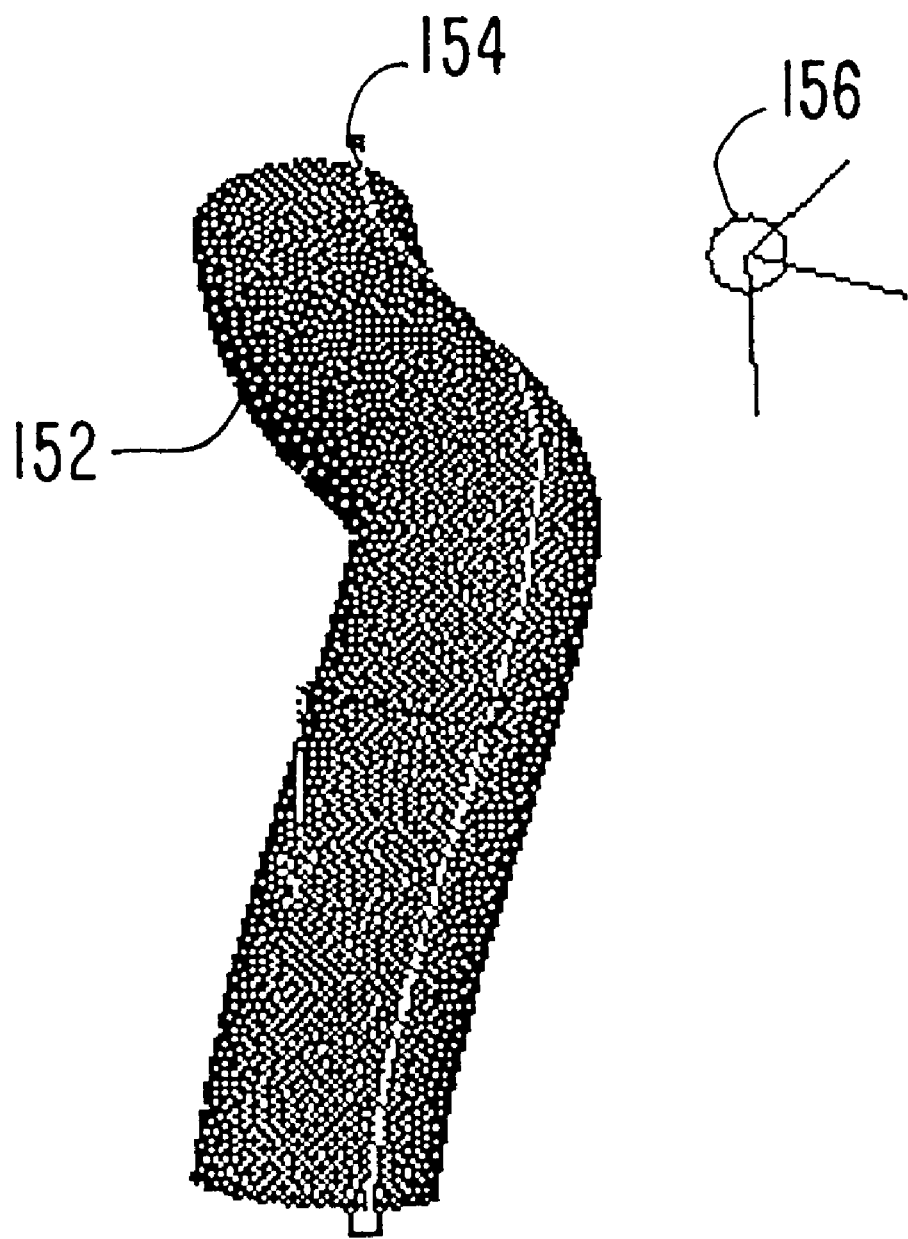
Figure 11D:
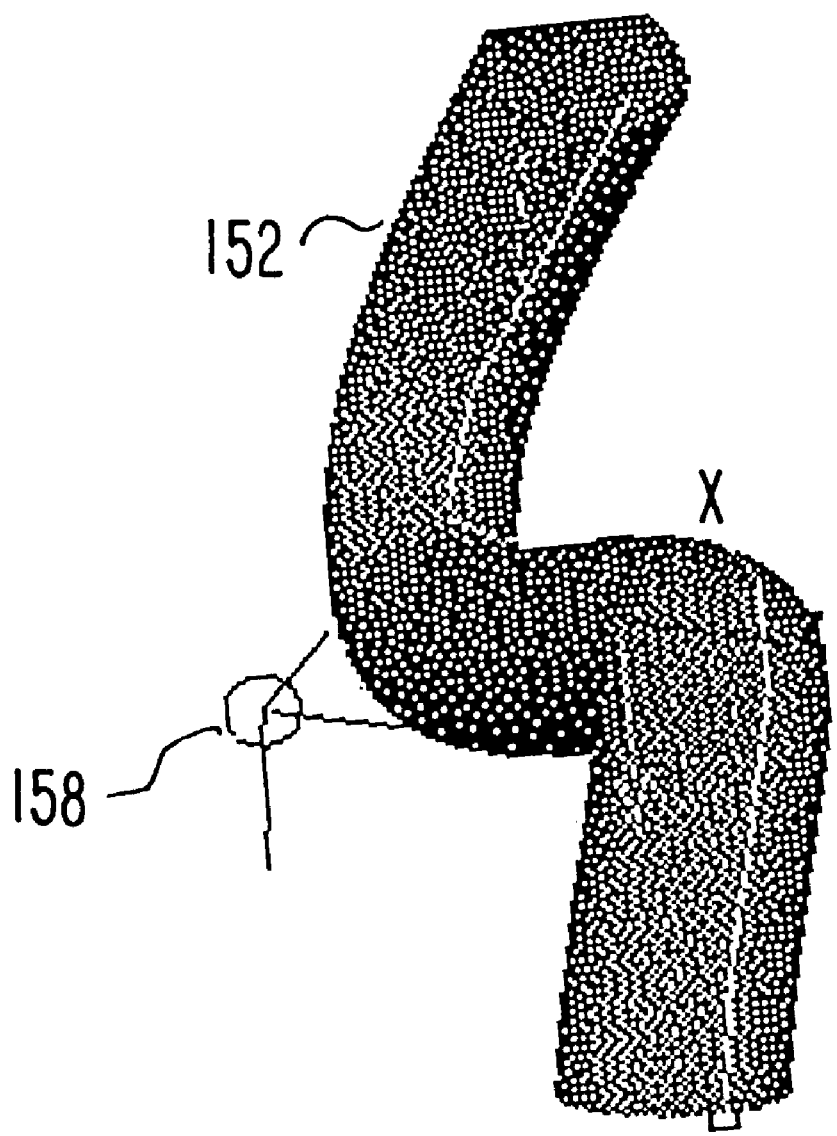
Figure 11E:
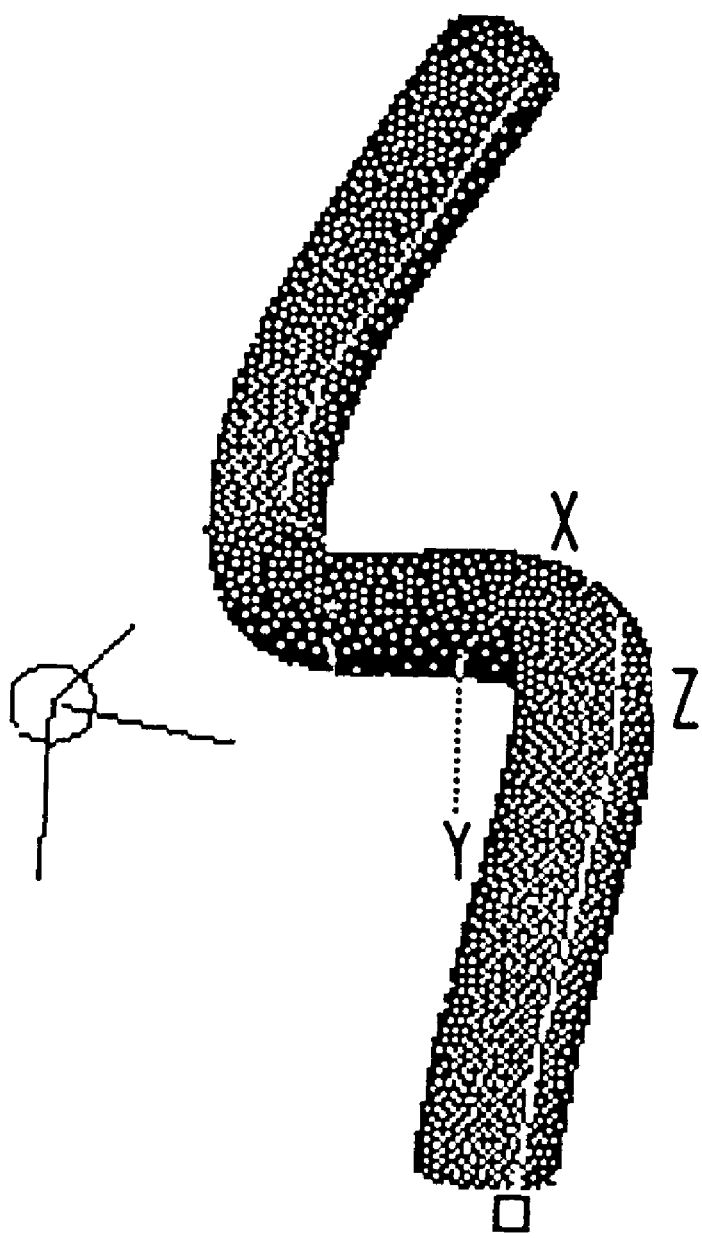
Figure 11F:
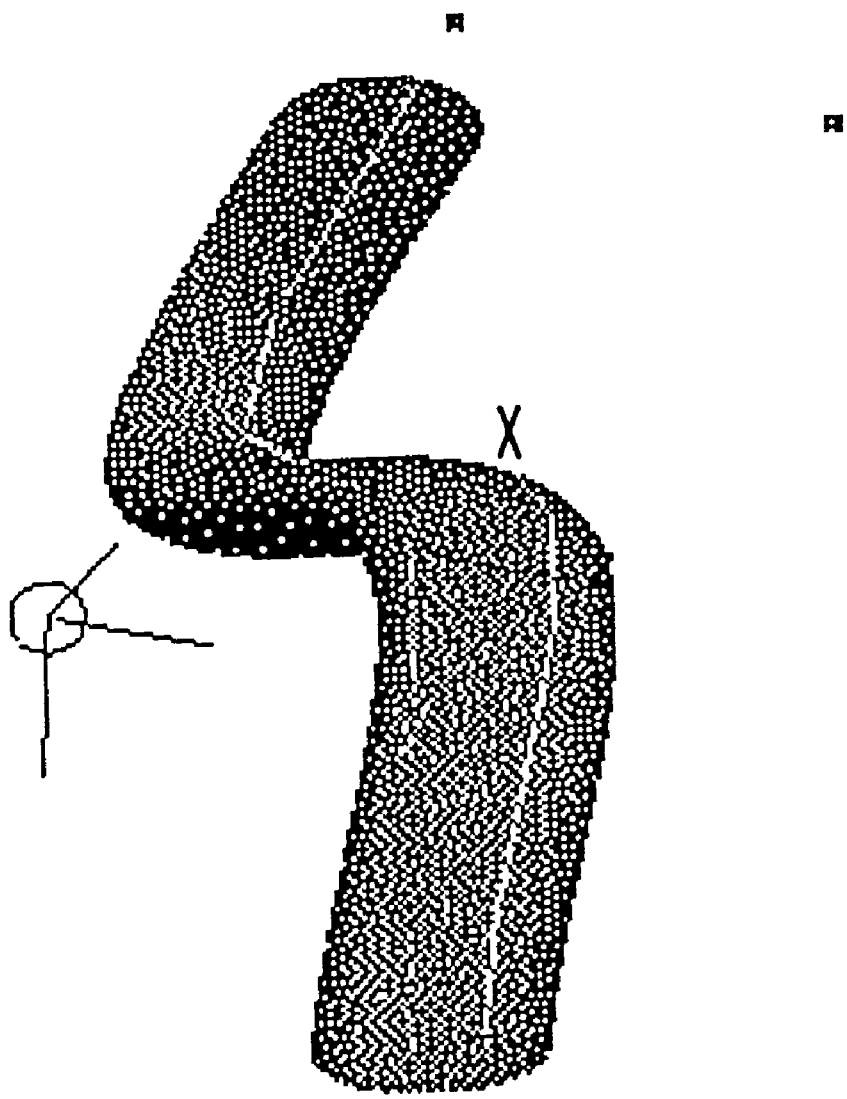

FIGS. 11a–11f illustrate the effect of the various deformation parameters previously described. FIG. 11a shows a tubular or cylindrical object 152 with an associated wire curve 154. FIG. 11b shows the deformation of the surface of the object 152 as a result of moving a control point 156 on the wire curve 154. In this figure the wire pulls the side of the object with it. However, the radius of influence, r, is so small that the radius does not include the opposite side of the object 152. In contrast, FIG. 11c shows the wire causing a more global deformation to the entire object as result of a large increase to r when the control point 156 moves the wire by the same distance. FIG. 11d shows the result of moving yet another control point 158 such that with the large r of FIG. 11c the entire object 152 tracks the wire 154. FIG. 11e shows the effect of reducing the scale factor s on the configuration in FIG. 11d with everything else kept the same. FIG. 11f further illustrates how the three stages of deformation can be tuned individually by attenuating the rotation due to tangency constraints on the configuration in FIG. 11d.

The wire deformation of the present invention was designed with usability and direct manipulation in mind. As discussed below, the invention also includes mechanisms that allow for finer user control over the wire deformation parameters.

Figure 12:
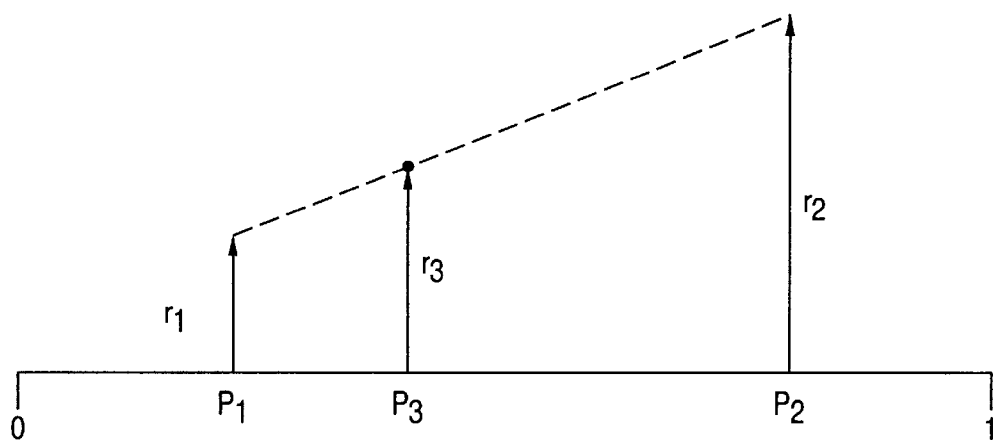
FIG. 12 illustrates locator interpolation.
Figure 13:
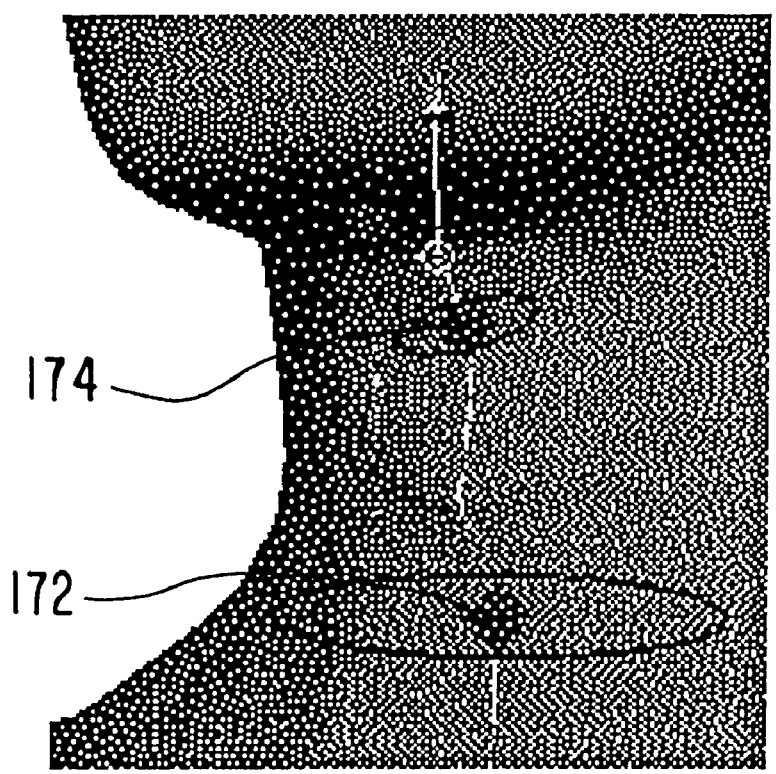
FIG. 13 illustrates such interpolation with the influence parameter.
Figure 14A:
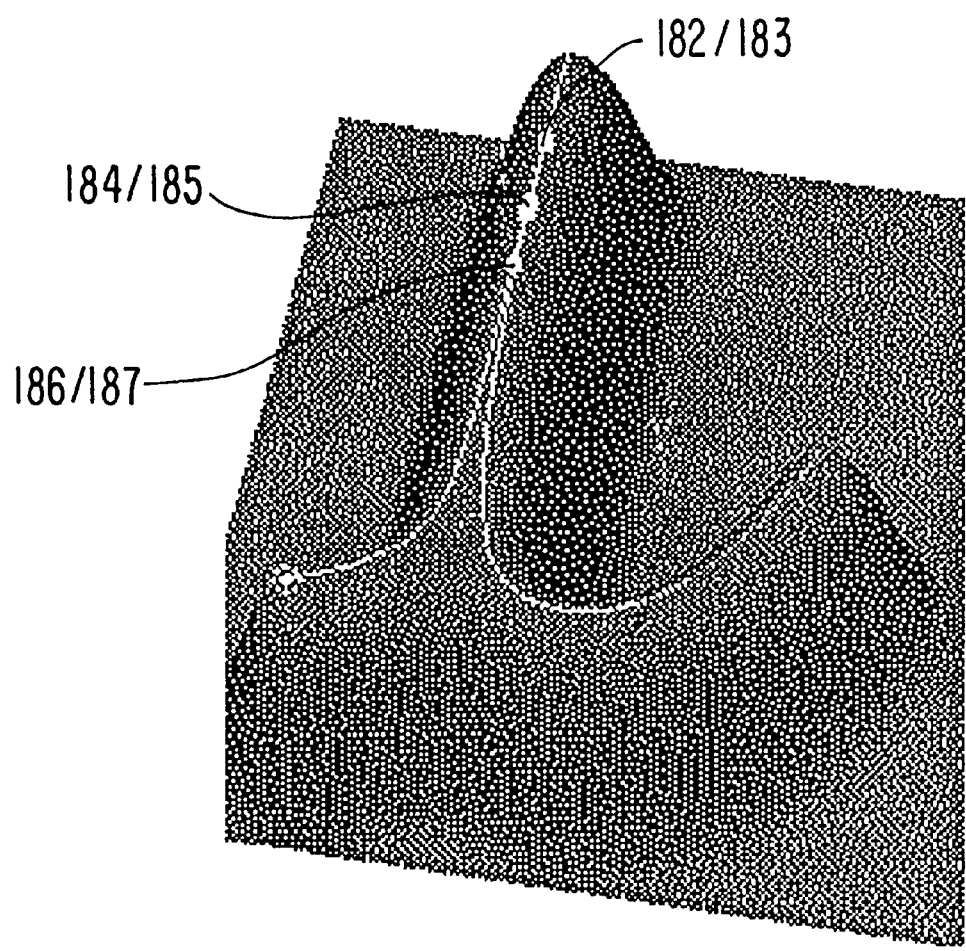
FIGS. 14a and 14b illustrate deformation amplitude changes.
Figure 14B:
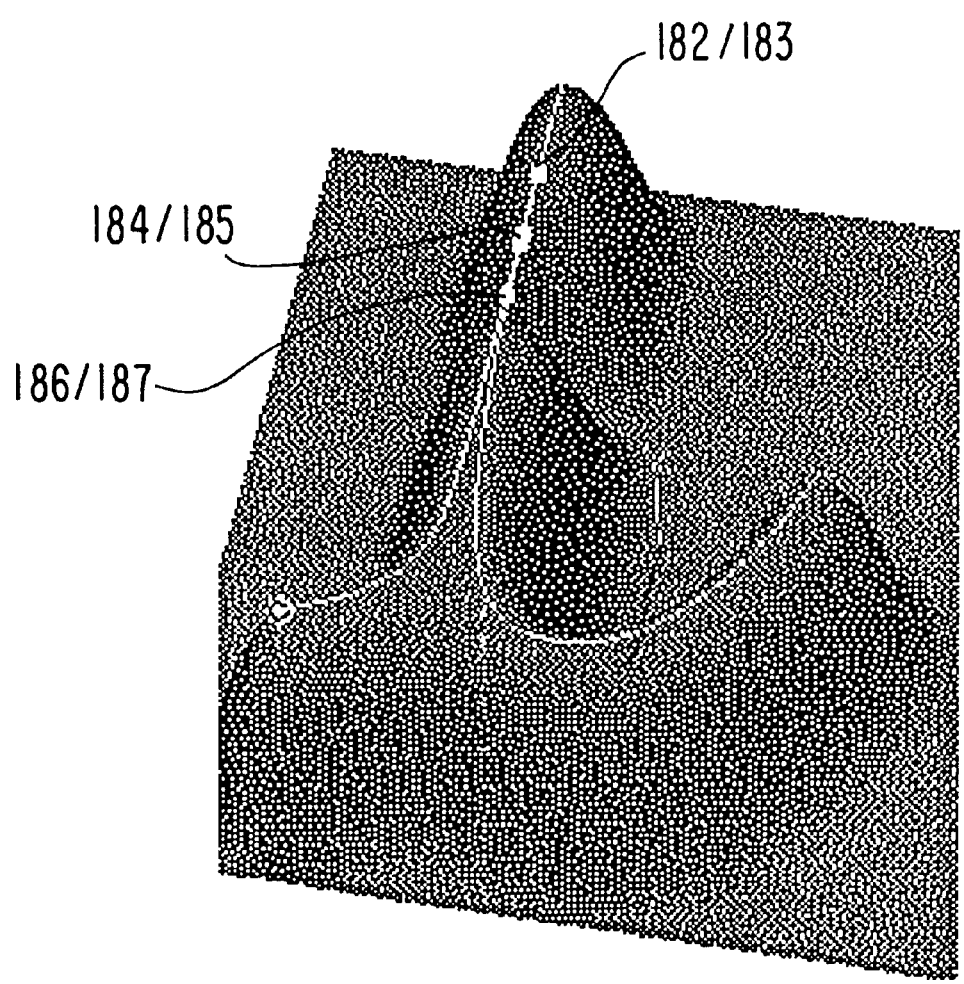

One approach to finer control involves using locators along a wire curve to specify the values of parameters along the wire. The animator can thus position locators along curves as needed to control locally, not only the radius of influence r, but any attribute related to wire deformation. The attribute being determined at a particular location or localized at a parameter value p is calculated as an interpolation between the attribute values specified at the two locators that bracket p. An example is graphically illustrated in FIG. 12. In this example, the values for the influence factor, r, are set at points $P_1$ and $P_2$ as $r_1$ and $r_2$ respectively. The value of $r_3$ at point $P_3$ is a conventional linear interpolation of the values of $r_1$ and $r_2$. This interpolated value is substituted for the r parameter in equation 2 for this particular point along W. Parameter values on the curve between 0 and P are an interpolation of the locator parameter at P value and the parameter set for the curve as a whole. The same interpolation applies between P2 and 1 using the parameter at P2. An example of the use of two wire locators used to model the cone-spherical shape of an Adam's apple is depicted in FIG. 13 accomplished by varying r. Local control over the amplitude or scale factor at six points 182/183, 184/185 and 186/187 of deformation causes the transformation from an "i" in FIG. 14a to an "l" in FIG. 14b. Locators can also be used to incorporate non-linear transformations such as the twist depicted in FIGS. 10a–10c, where they are used to control the twist angle along the wire. Twist angle values specified at the locators allow calculation of an interpolated twist angle at any point on the wire curve. The twist rotation of the angle around $R(p_R)$, about axis $R'(p_R)$, is composited with the tangential rotation which is a step of the algorithm discussed herein.

The function F can be combined with other functions to assist in locator type control. In particular, directional control can be provided by modulating F with a function for an angular drop-off around an axis perpendicular to the wire. Both the directional axis and drop-off angle can be interpolated by locators.

Figure 16A:
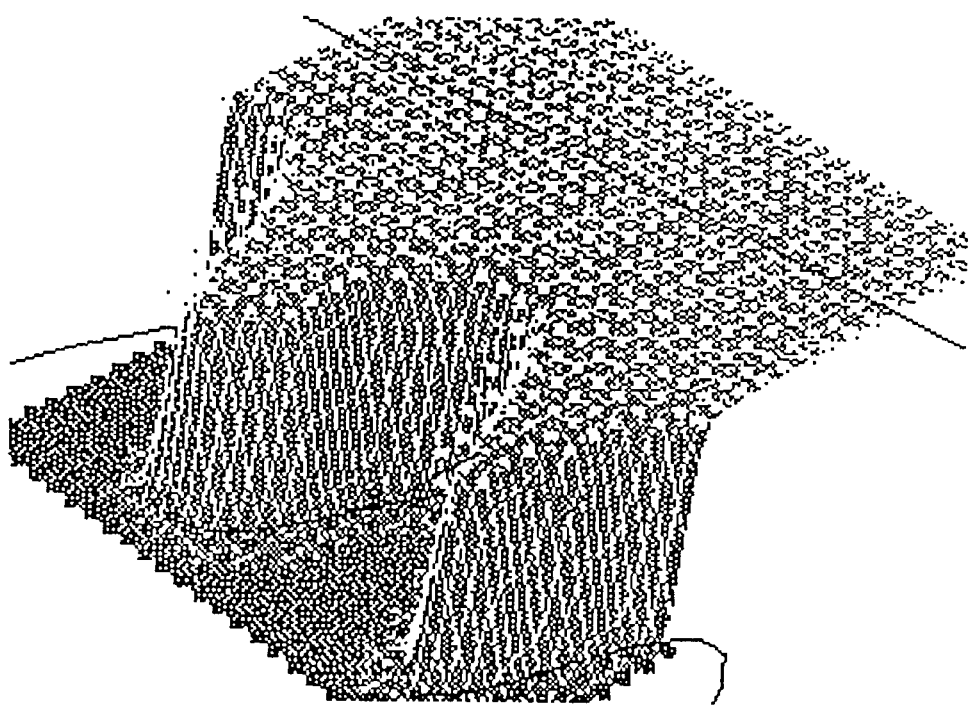
FIGS. 16a–16c holder curve and wire interaction.
Figure 16B:
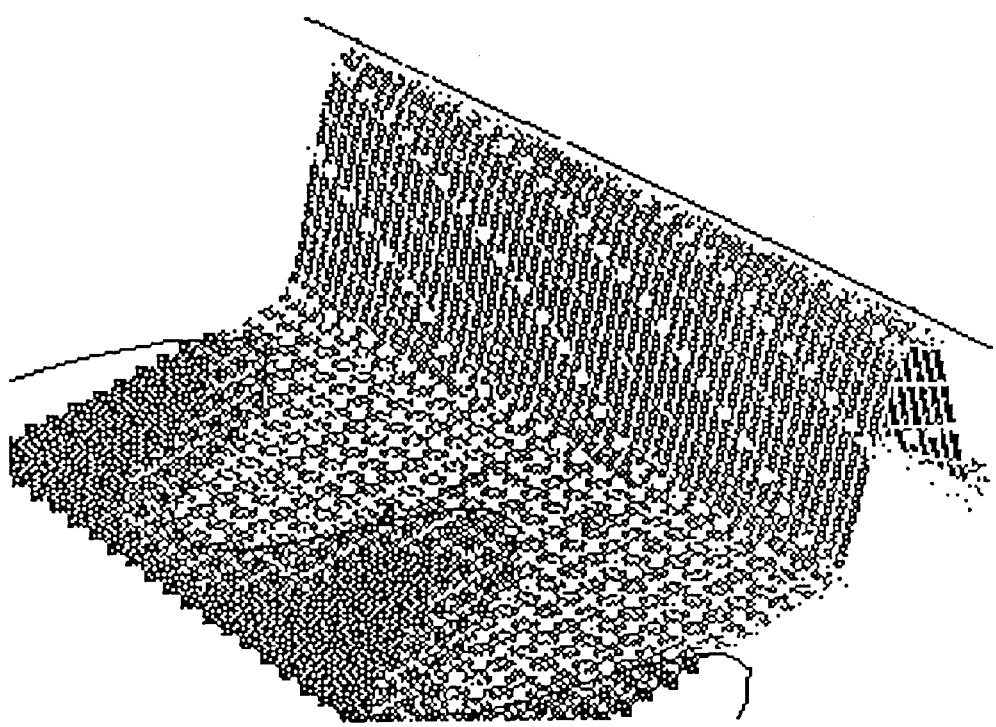

Locators provide radially symmetric local control along and around a wire. Anisotropic directional control in the present invention is provided by free-form parametric holder or domain curves as illustrated in FIGS. 15a–15d (and 16c to be discussed later). FIG. 15a depicts a surface 192 of an object that has been deformed by the movement of a wire 194 in a direction as depicted the arrow. The original surface is shown by the dashed line. A holder curve 196 placed on the surface before the wire is added can be used to hold the original surface 192 in place as the wire curve 194 deforms the surface of the object as depicted in FIG. 15b. This is depicted in three dimensions in FIGS. 16a–16c. Allowing a specified portion of a wire curve, such as a subset of control vertices on an object, to be deformed provides some degree of smoothness or transition control. However, smoothness properties may be compromised in parts of the object surface defined by control vertices that are selectively deformed as shown in FIGS. 16a and 16b. While this may be desirable in some cases, often one expects a smoother drop-off based on the region selected, such as that shown in FIG. 16c in which a holder curve 202 is used with a wire 204.

A holder or domain curve can also be used to hold a deformation in place as depicted in FIGS. 15c and 15d. A domain curve 197 added to a model after it has been deformed by a wire 198 is shown in FIG. 15c. when the wire is moved as shown by the arrow in FIG. 15d the deformation is held in place by the holder 197.

Domain curves along with a wire's reference curve R define a primitive function applied over a finite volume. This provides incremental, direct control over what parts of the object are deformed (using holders) and by how much they are deformed (using wires).

Figure 16C:
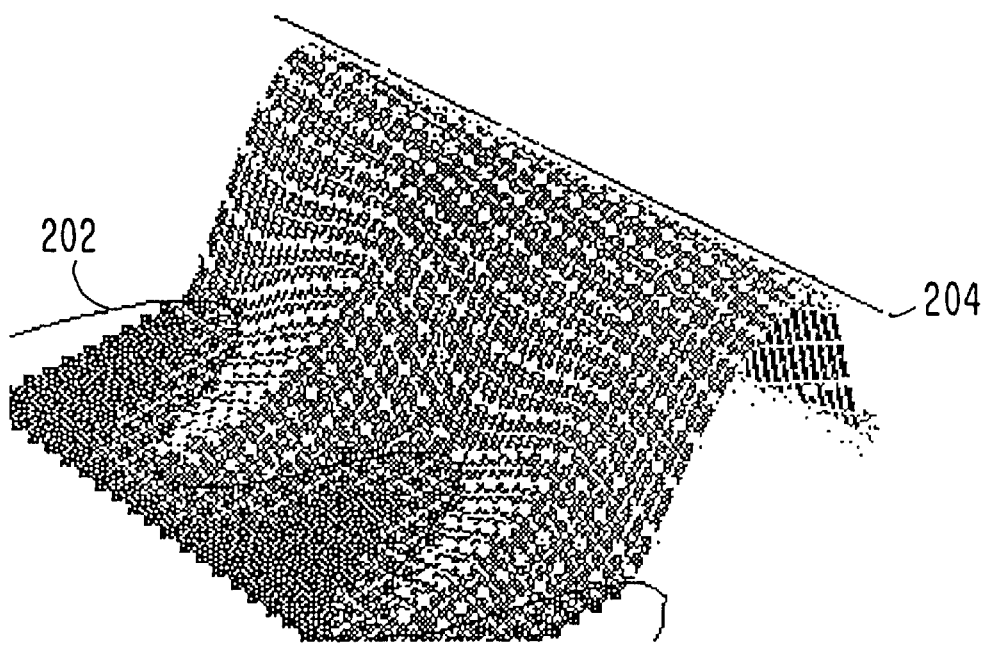
Figure 17:
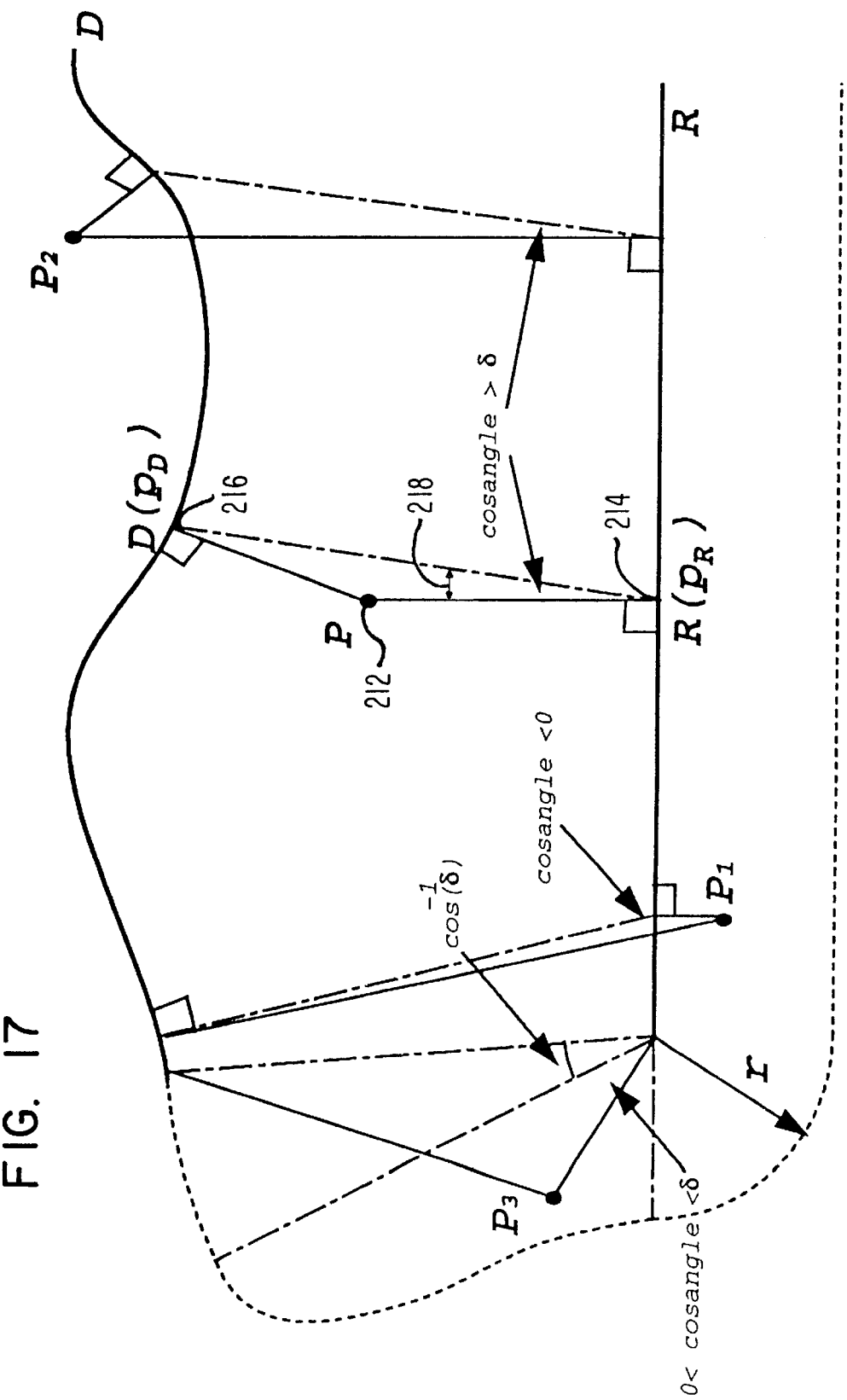
FIG. 17 illustrates determining holder curve effectiveness.

As illustrated previously, a holder or domain curve D is oriented and demarcates a region of the object surface to be deformed and along with the reference curve R acts as an anchor for the deformation. It influences the shape of the offset or influence region defined by r. For a general implementation the domain curve is defined to be a free-form curve rather than a closed curve on the object surface. Using an arbitrary curve as a holder or domain curve does not unambiguously determine which points on the object surface will be deformed. However, most animators through experience with using curves in general, will have a very good idea of how a given holder curve will affect the region of the object to be deformed, based on the spatial relationship between the wire, domain curve and object surface. The invention, as depicted in FIG. 17 and discussed below, uses distance and angle computations between points on the object surface, the domain curve and reference curve R to determine if and by how much the point will be influenced. In the example of FIG. 16c, the holder was defined to have a "one-sided" influence region affected by the wire curve. The other side is affected only by the conventional drop-off radius r. The blending function that controls the fall off of the distortion is bounded by the wire curve and the holder curve whenever the holder curve is within the influence region defined by r. Essentially, the distance between the wire curve and the holder becomes r. In general one-sided influence regions for holders are preferred but the holders can have influence on more than one side.

The implementation of the preferred one-sided holders within step 50 of FIG. 5 is as follows. The first step is to determine if the domain curve D will be used to define the function f at a point P. We set $$\text{cosangle} = (D(p_D) - R(p_R)) \cdot (P - R(p_R)). \quad (7)$$

The domain curve will define the function if cosangle >0. This selects points that lie on the same side of R as D (even though the concept of side is not well defined mathematically). This notion of same side tends to be captured by an acute angle subtended at $R(p_R)$, for a triangle with vertices at $P, D(p_D)$ and $R(p_R)$.

This determination can be described visually as depicted in FIG. 17. A point 212 which may be located on the same side of wire 214 (going into the page) as a holder 216 (also going into the page) forms an angle 218 with respect to a line drawn between corresponding points on the wire 214 and holder 216. If this angle 218 is greater than 90 degrees, the point 212 is not on the same side of the wire 214 as the holder 216. If the angle 218 is 90 degrees or less (as depicted in the example of FIG. 17), the point is on the same side.

If the above same side condition is satisfied for P, then $$F(P, R) = f\left(\frac{\|P - R(p_R)\|}{\|R(p_R) - D(p_D)\|}\right) \quad (8)$$

For points considered to be outside the domain defined by the domain curve that is, not on the same side of the curve R as the holder, the conventional drop-off radius calculation is applied. For each holder curve associated with a wire the above calculations are done separately. This approach to domain curve affected points may lead to a discontinuity around points where cosangle=0. This discontinuity can be removed by $$F(P, R) = f\left(\frac{\|P - R(p_R)\|}{\text{Interp(cosangle)}}\right)$$

where the function Interp provides a smoothly interpolated value from r to $\|R(p_R)-D(p_D)\|$ as the cosangle varies.

Figure 18A:
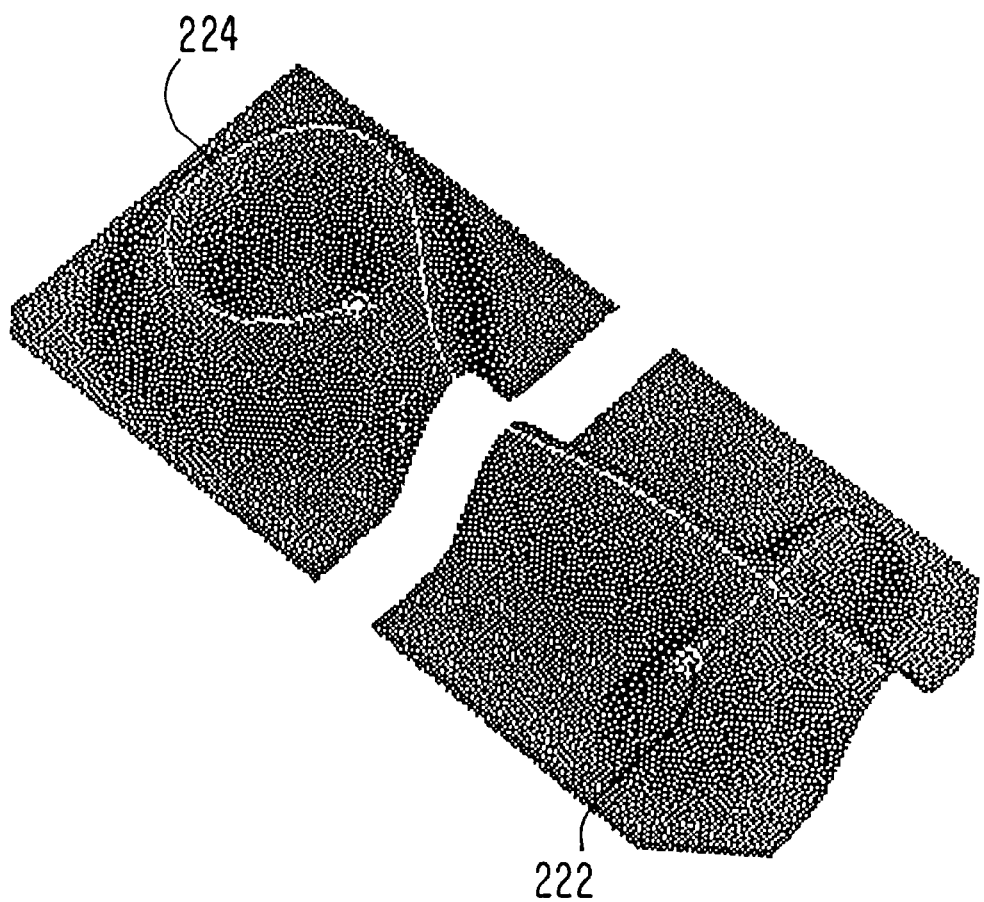
FIGS. 18a and 18b compare effects of wire combinations.
Figure 18B:
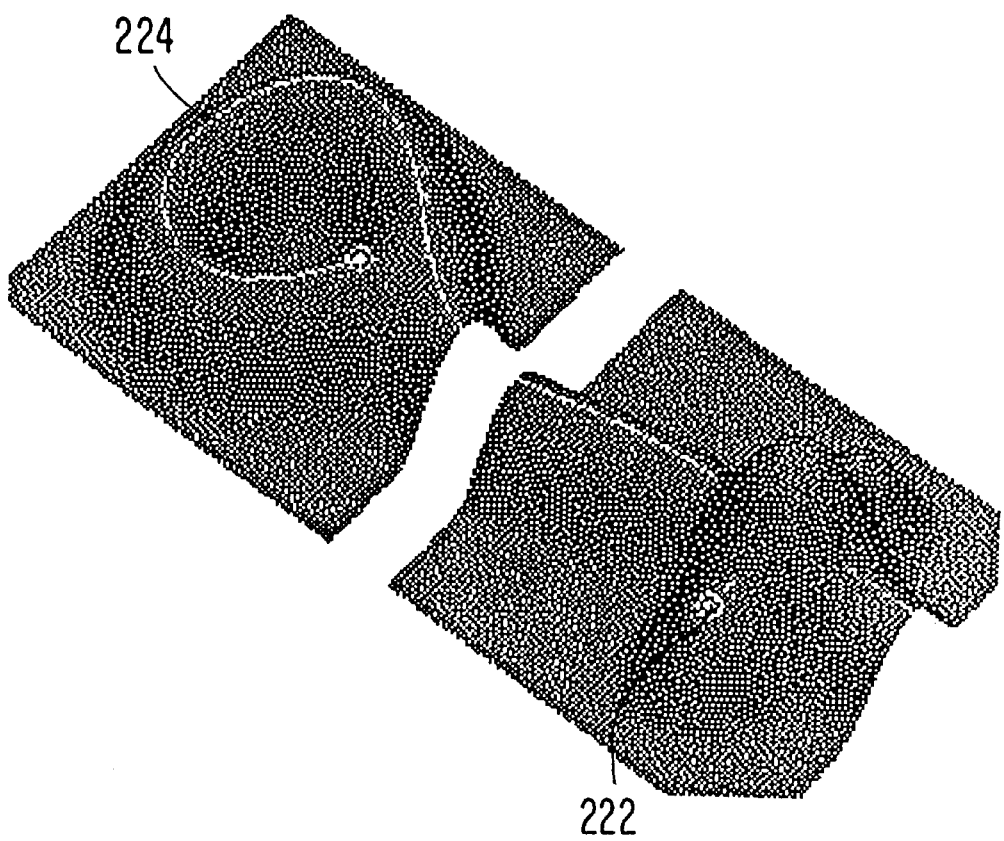

As discussed earlier, the present invention is designed to allow multiple wires and the interaction of multiple wires to provide an overall definition of the object's shape (see FIG. 1b). The invention takes advantage of a sculptor's armature metaphor to give the expected behavior of a deformation in regions where more than one wire curve has an effect. In an armature, an overall shape deformation can be seen as a smoothed union of the deformations caused by each wire. That is, the fields of the deformations are smoothly combined. This behavior, which the invention provides, can be seen in the X pulled out of a plane by two wires 222 and 224 in FIG. 18a. This figure shows a merger or composition of the effects or fields of the two wires using an integration approach of the invention as described below. The results are quite different than the traditional superposition of the deformations due to each wire as in FIG. 18b where the crossing of the two wires causes an unnatural bulge to appear, which would not be expected if a traditional armature sculpture were being used. The present invention is also formulated such that subdividing a wire curve into two curves does not affect the deformation applied to the object (such as an unwanted bulge where the two curves abut).

It is possible for multiple wires to create aggregate blobs which should not appear in the deformed object. The problem of unwanted aggregate blobs can be circumvented in by making deformations due to multiple deformers incremental. However, this would defeat the main purpose of getting interesting aggregate behavior from many in teracting wires.

The present invention provides a better solution as follows. First, define the $i^{th}$ wire deforming an object as $<W_i,R_i,s_i,r_i,f_i>$. The operation of integrating the effects of several wires is depicted in FIG. 19 and is inserted into the loop of FIG. 6 after step 88. The resulting deformation of a point P on an object induced by wire i results in $P_i$ as previously discussed from step 88 in FIG. 6. The difference $\Delta P_i=P_{defi}-P$ is then calculated 232 (see FIG. 19). In this situation the deformed point $P_{def}$ as influenced by all wires is calculated 234 as the following blend:

$$P_{def} = P + \frac{\sum_{i=1}^{n} \Delta P_i \cdot |\Delta P_i|^m}{\sum_{i=1}^{n} |\Delta P_i|^m} \quad (10)$$

Figure 20C:
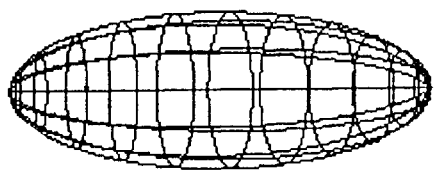
FIGS. 20a–20f depict the combination of two deformations with different parameter values.
Figure 20F:
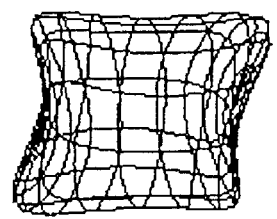
Figure 20B:
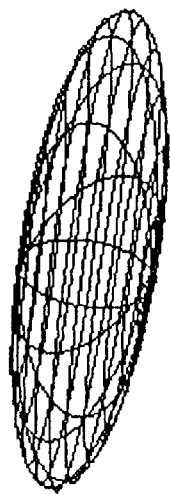
Figure 20E:
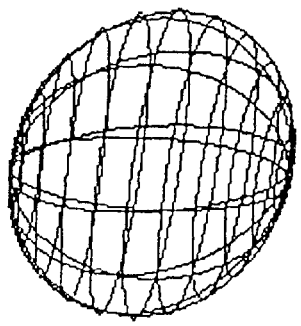
Figure 20A:
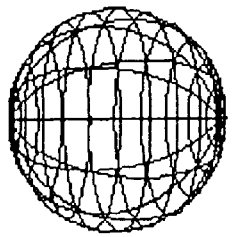
Figure 20D:
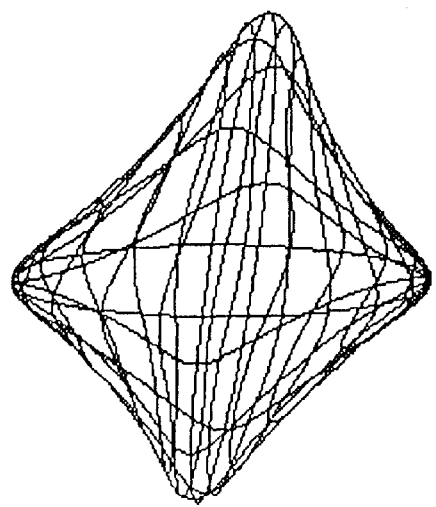

The resulting behavior varies with the blending factor m from a simple average of the $\Delta P_i$ when m=0, converging to max$\{\Delta P_i\}$ for large m. Increasing m provides more local influence by the wires when they are in the same region. The integration of two squash-stretch deformations is depicted in FIGS. 20a–20f for different values of m. FIG. 20a depicts an undeformed object, FIGS. 20b and 20c depict the two deformations that are integrated using the technique of the invention. FIG. 20d depicts the integrated deformation when m=5, 20e when m=1 and 20f when m=−2.

When m is negative, it is technically possible to have a singular denominator. However, if equation 9 is reformulated as set forth below with Π representing the product of all $\Delta P_j$ that are not i:

$$P_{def} = P + \frac{\sum_{i=1}^{n} \Delta P_i \cdot \prod_{j \neq i} |\Delta P_j|^{|m|}}{\sum_{i=1}^{n} \prod_{j \neq i} |\Delta P_j|^{|m|}} \quad (11)$$

the singularity is removed. In practice it is prefer able to use the original formulation even for negative m and simply omit those $\Delta P$'s that are zero. Observe that as m gets increasingly negative, the displacement approaches min$\{\Delta P_i\}$. Indeed, each wire i could have its own exponent $m_i$, giving finer control over its contribution to the result in regions of interaction.

The above formulation has some desirable properties for typical values of m≧1. In a region where only one wire curve is relevant, the result is precisely the deformation of that wire. In regions where multiple wire curves produce the same deformation, the result is the deformation induced by any one of those curves. In general, the result is an algebraic combination of the individual wire deformations, with a bias (controlled by m) toward the deformations which have a larger magnitude. That is, the larger deformation is preserved.

Many augmentations of the present invention are possible. For example, we can blend the above deformation with a simple addition of wire deformations given by $P_{def}=P+\Sigma_{i=1}^{n}\Delta P_i$. We can also attach different exponents m to each holder or domain curve; this allows us to introduce holder curves that refine the implicitly defined volume in an additive or subtractive fashion controlled by the sign of each exponent.

Figure 21A:
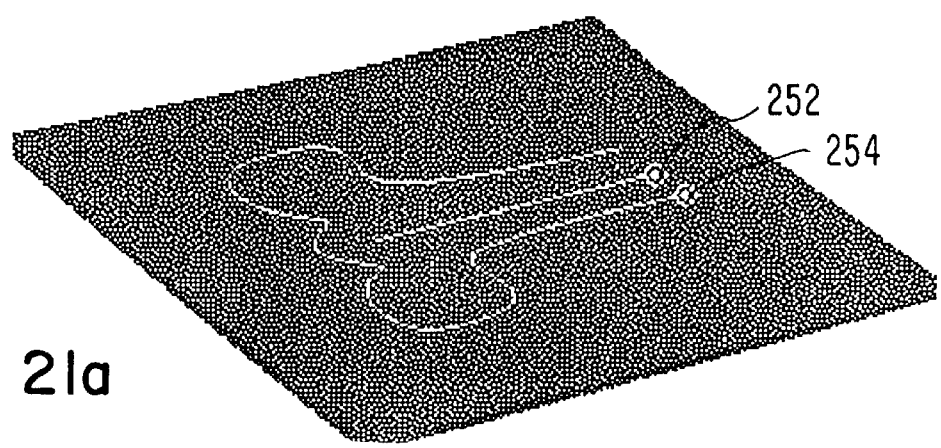
FIGS. 21a–21f depict controlling wire localization.
Figure 21B:
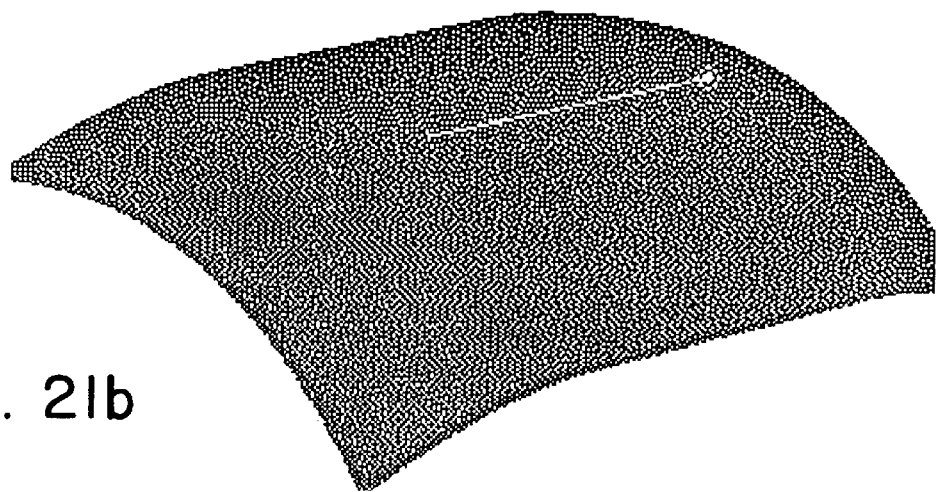
Figure 21C:
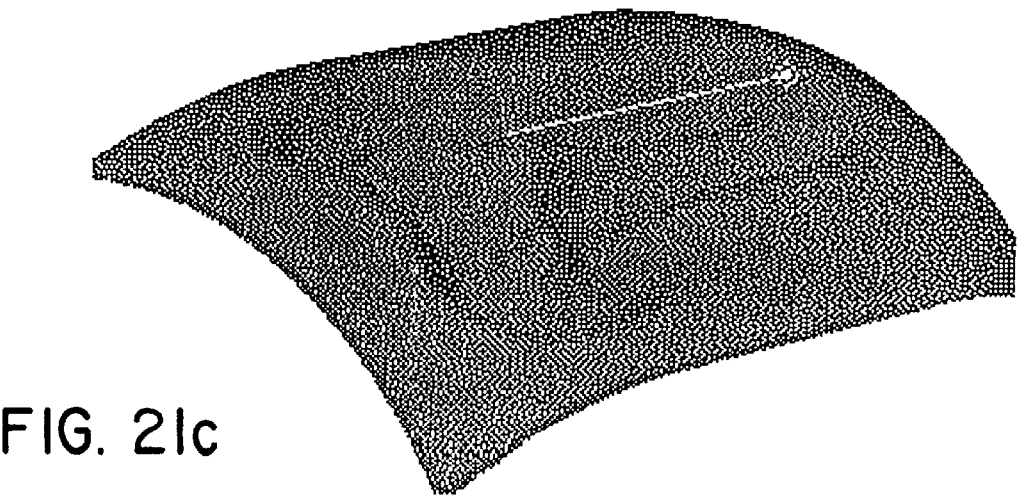

Another useful variation is to introduce a local influence of a wire at a point on an object's surface relative to other wires. In the formulation above, only wires that directly deform a point are of consequence. FIG. 21a depicts a figure with two wires 252 and 254 and with no deformation. In FIG. 21b, the central straight wire 254 lifts a large portion of the surface when it is translated upwards. Because the outer curve did not move, it did not influence the surface. In FIG. 21c, however, wire 254 acts like an anchor, exercising a local influence on the surface that is independent of the deformation it imparts (in this case none), but depends on the proximity of points in space to the curve. The present invention uses $F(P,R_i)$ as a measure of proximity or local influence for the wire. The preferred formulation used for this behavior is $$P_{def} = P + \frac{\sum_{i=1}^{n} \Delta P_i \cdot F(P, R_i)^k}{\sum_{i=1}^{n} F(P, R_i)^k} \quad (12)$$

The factor k has a similar effect that m had earlier. A parameter localize combines this deformation with the others defined earlier. That is, this step is also executed after step 88 within the loop of FIG. 6.

Figure 21D:
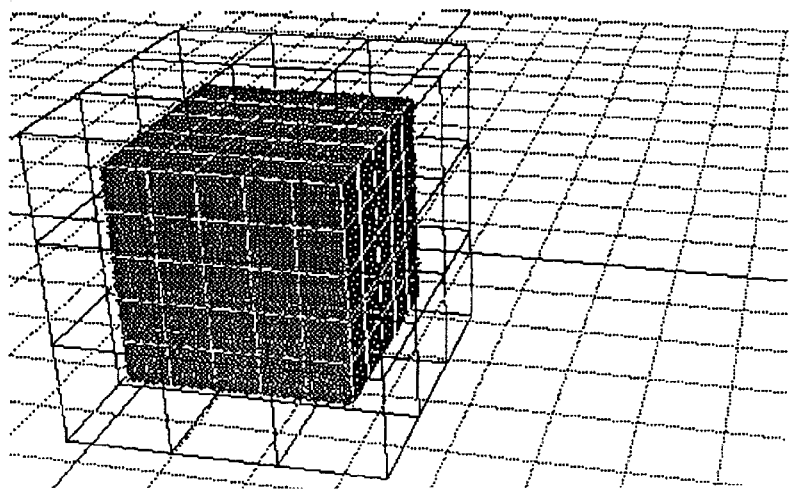
Figure 21E:
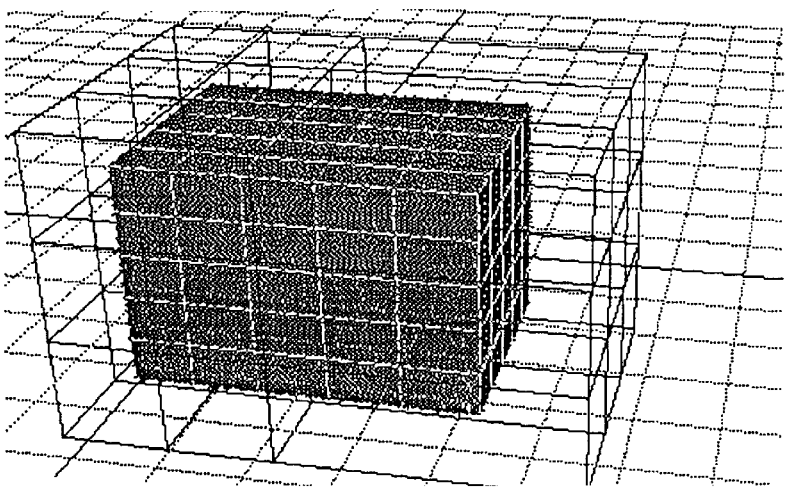
Figure 21F:
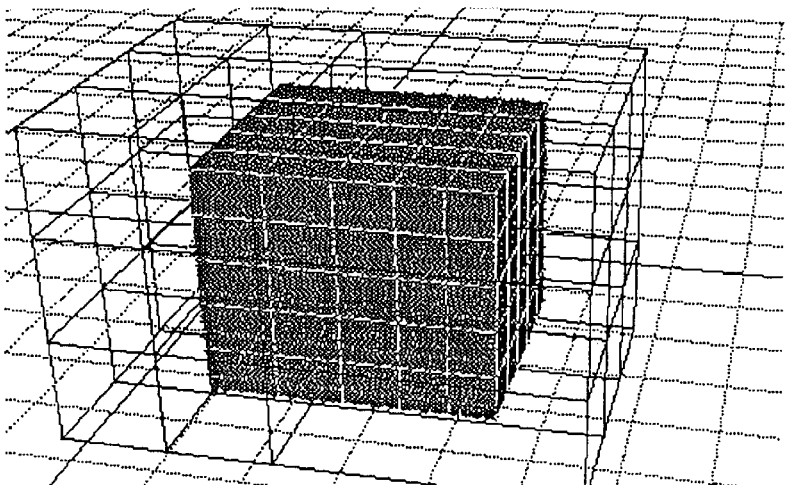

A similar effect can be seen in FIGS. 21d–21f, where wire curves simulate the behavior of an FFD lattice where FIG. 21d depicts no deformation. A wire curve is generated along each lattice line. Large drop-off radii ensure planarity is preserved on the deformed cube when the right face of the lattice in translated out, as can be seen in FIGS. 21e and 21f. The difference in behavior with and without the localized influence computation is evident from the more global deformation in FIG. 21f over FIG. 21e. The formulations described herein are equally applicable to other deformation techniques and can even be used to combine the results of different deformation approaches.

The versatility of the wires of the invention will be illustrated with three examples that exercise different aspects of wire deformations. The first shows how wires may be used to control wrinkle formation and propagation on a surface. Such surface oriented deformations are localized to increase surface detail; they are currently handled well by techniques such as displacement maps. The second shows wires to be useful for stitching and tearing geometry, which again is a surface oriented deformation. Finally volume oriented deformation is described in which a flexible skeletal curve is generated from a traditional joint hierarchy and is used to bind articulated geometry as a wire. FIGS. 11b and 11c visually distinguish between surface and volume oriented deformations.

Wrinkles and creases can greatly enhance the realism of animated deformable objects. Cloth animation has become an important area of computer animation, especially related to human figure animation. Wires will be shown below to be effective in animating the crease lines along which wrinkles propagate. Wrinkle creases are either drawn as curves on the object surface by the animator or automatically generated in a set of predefined patterns.

Figure 22A:
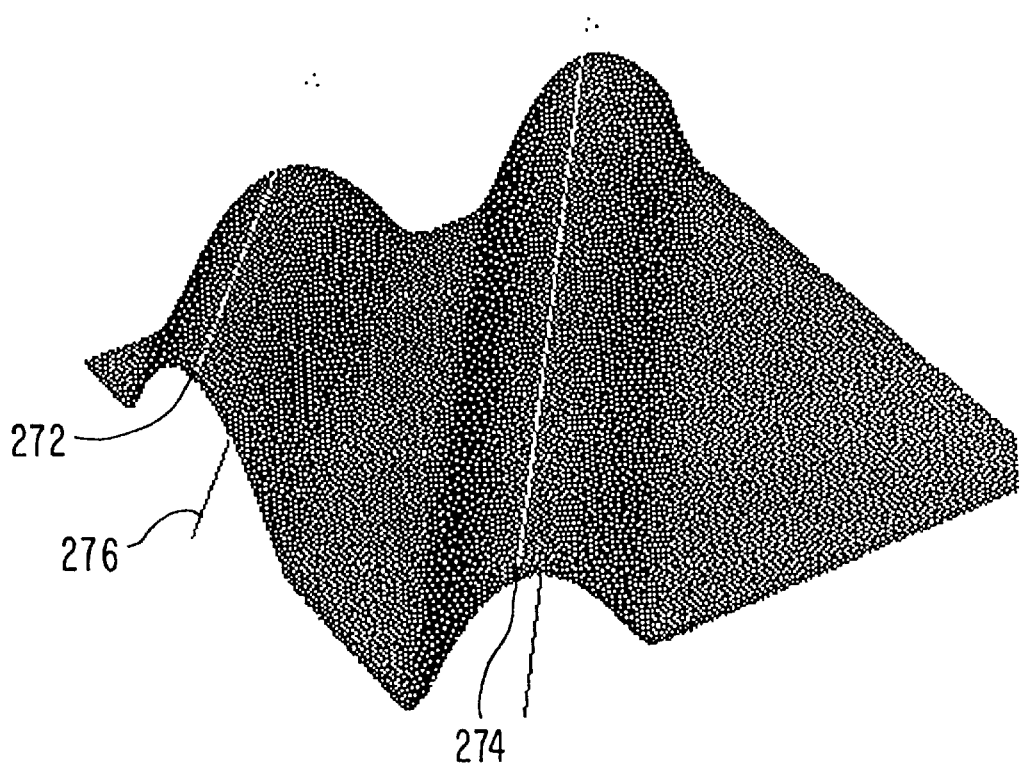
FIGS. 22a and 22b depict creating moving wrinkles using the invention.
Figure 22B:
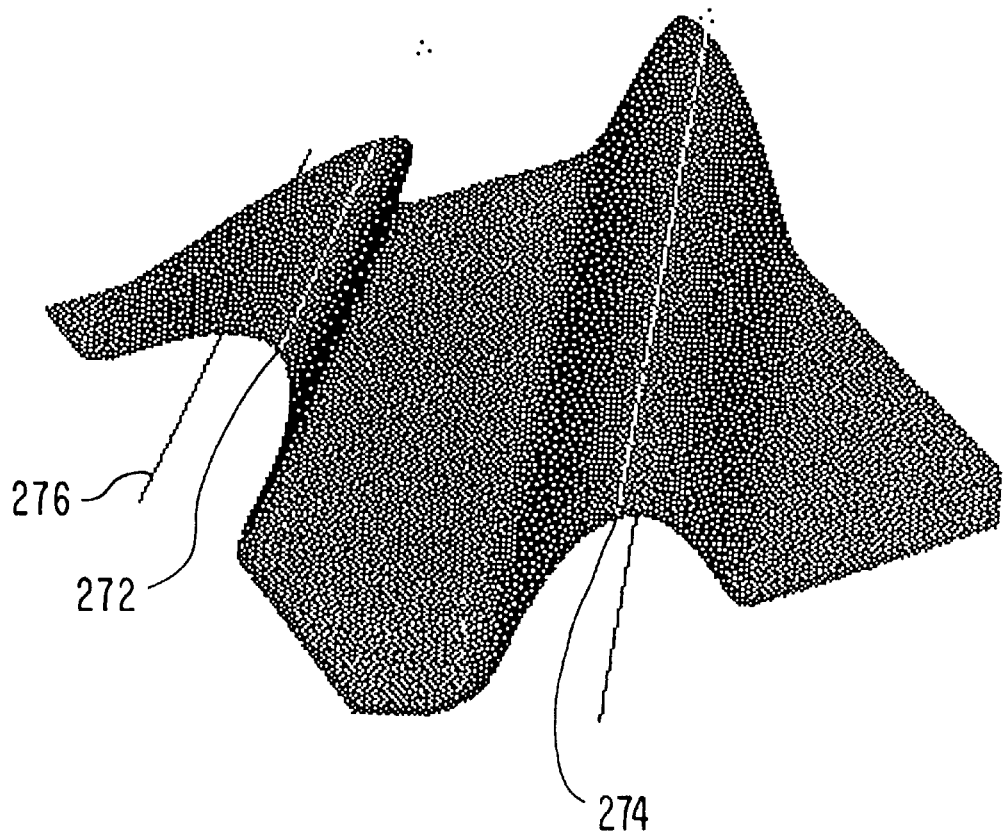

Typical properties such as wrinkle thickness, intensity and stiffness of the material are easily captured by the various wire deformation parameters. The extent of wrinkle propagation can also be controlled. FIGS. 22a and 22b show two wire curves as magnified wrinkles. FIG. 22b shows the wrinkles propagating along the object surface. While one wrinkle is pulled along, remaining anchored, the other travels along the surface. The traveling wrinkle in FIG. 22b is a result of pulling the base-wire curve R 272 along the object surface with the wire curve W 276. Controlling the motion of W and R along the object surface by linking them with a hysterisis function thus provides control over wrinkle propagation.

Figure 23A:
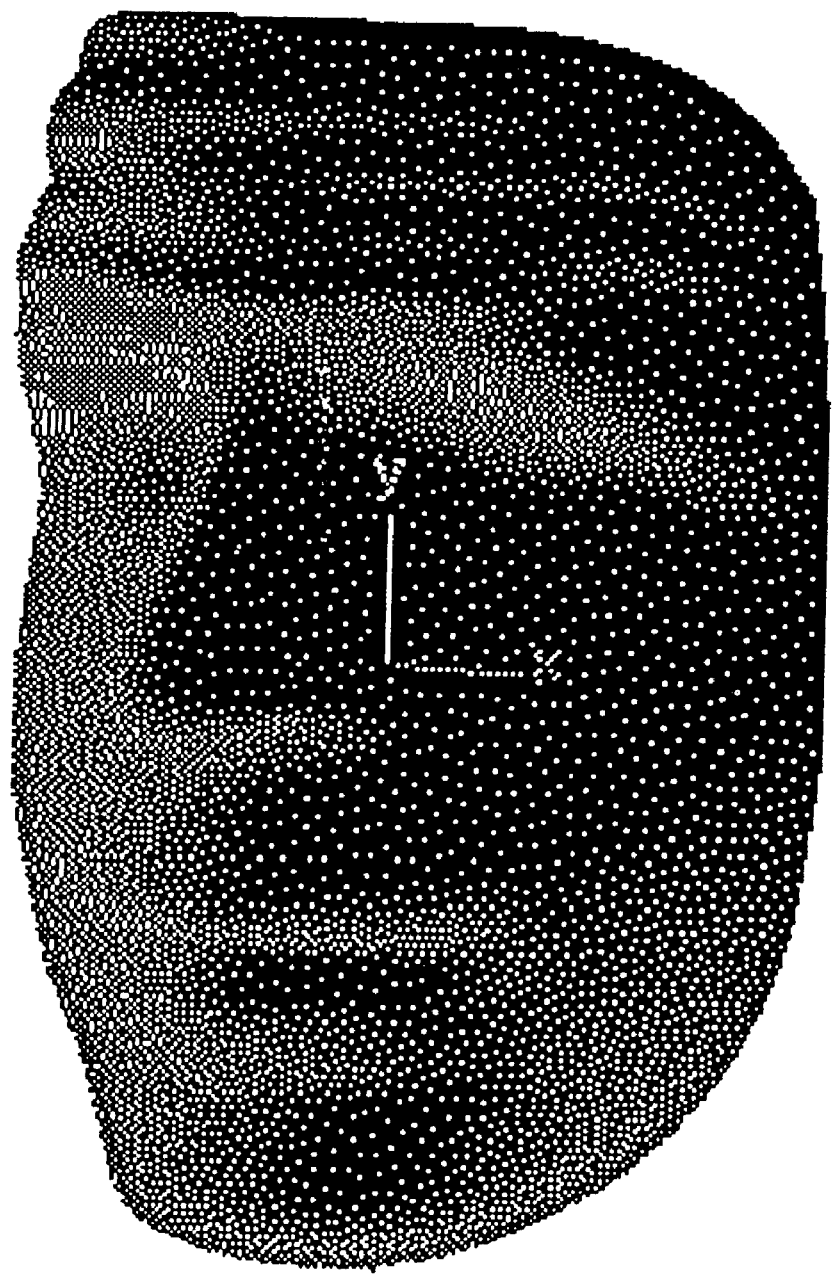
FIGS. 23a–23c depict other types of wrinkles.
Figure 23B:
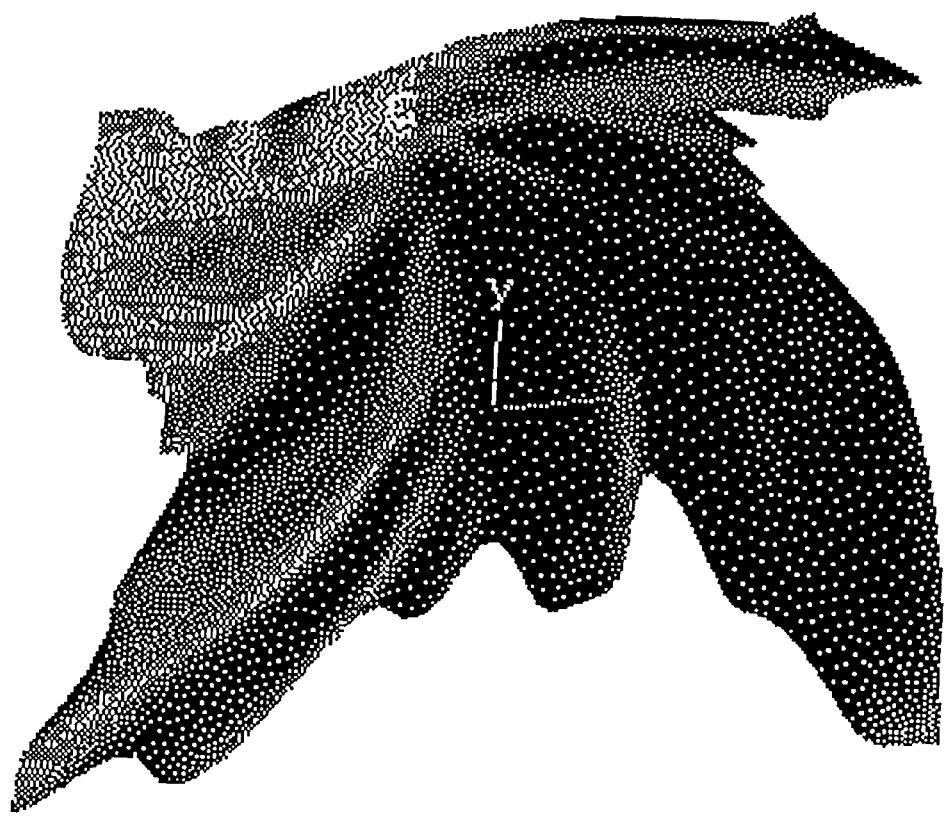
Figure 23C:
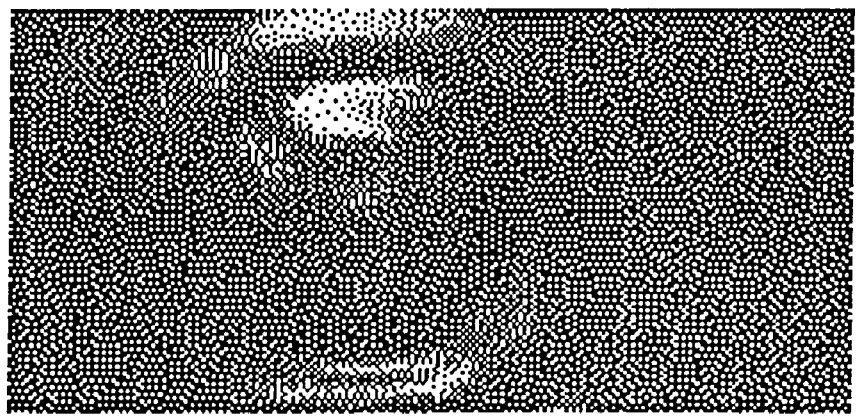
Figure 24:
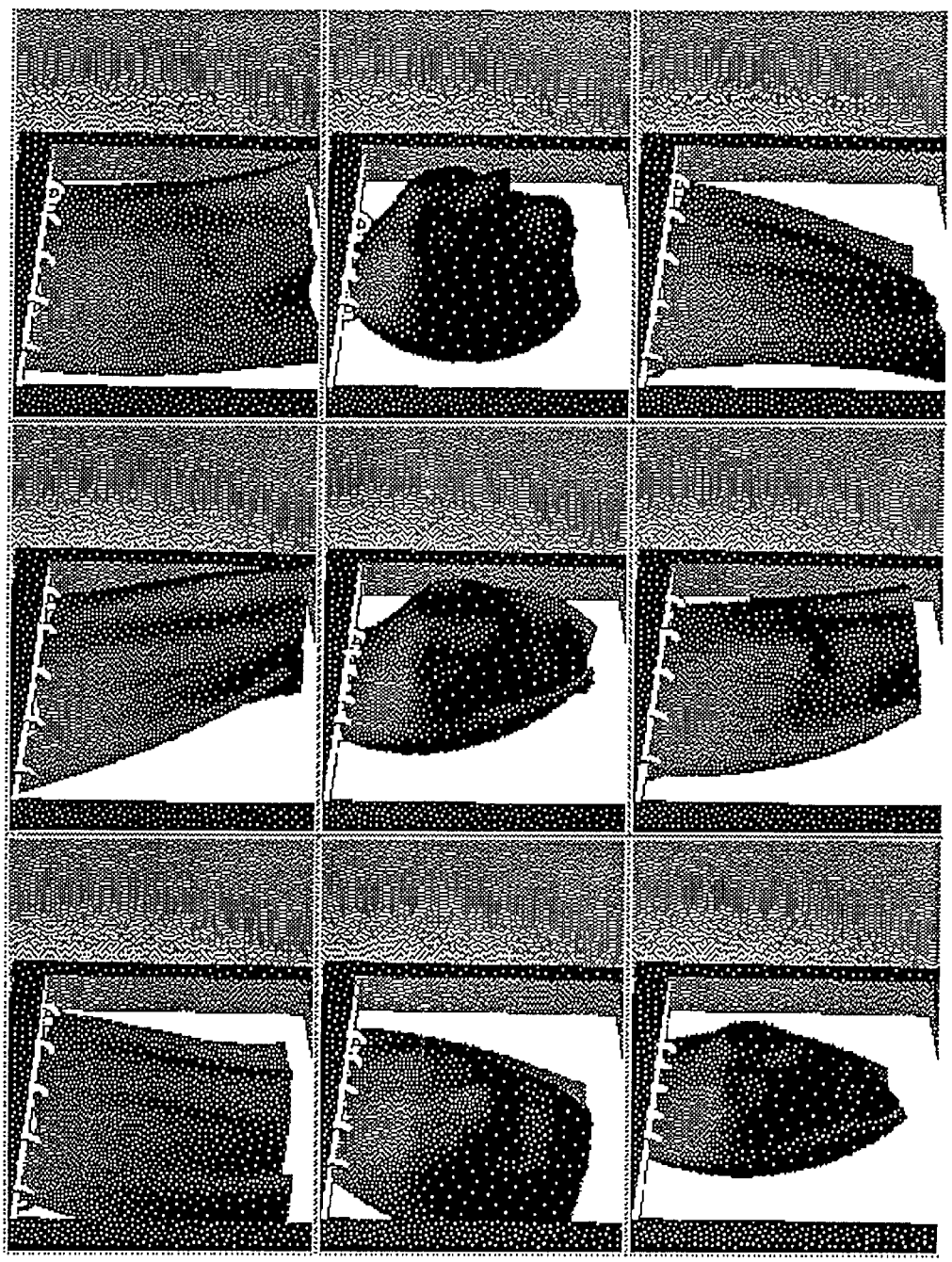
FIG. 24 depicts using the invention to animate a curtain.

FIGS. 23a–23c show wrinkles, tangential, radial and ripple, respectively, that are procedurally generated by specifying parameters such as the number of crease lines, thickness, intensity, stiffness, and resistance to propagation. The approach is geometric and fast; it allows the animator intuitive control over many salient visual features of wrinkle formation and propagation. FIG. 24 shows a series of curtain views animated using wires. The wire curves are physically simulated for a bead-curtain like animation with a reduced number of points allowing the animation to be performed quickly to show the animation will work. The wires are then used to deform the object surface in a higher resolution animation of a complete curtain.

Figure 25:
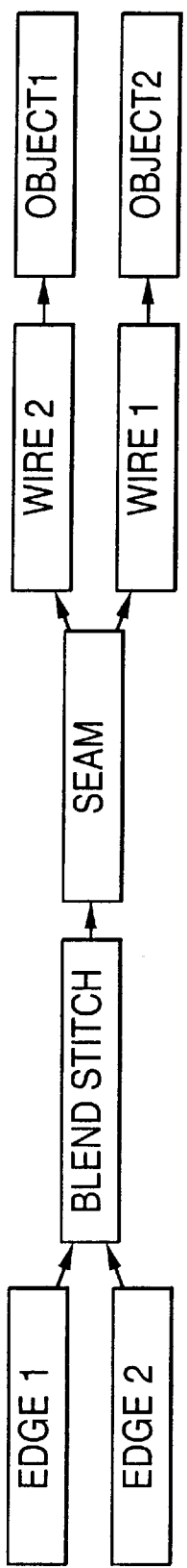
FIG. 25 depicts the process of stitching.
Figures 26A, 26B:
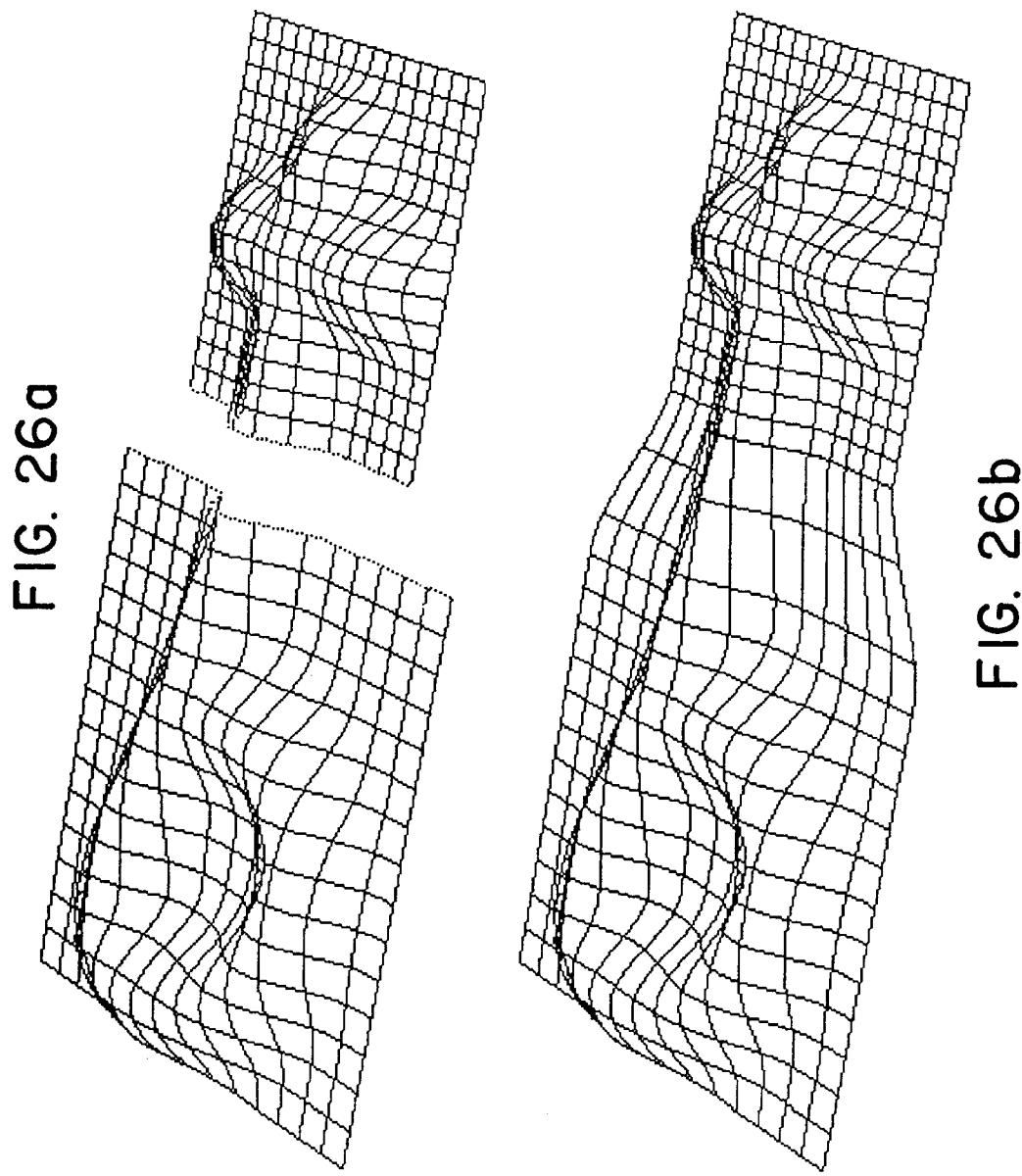
FIGS. 26a and 26b shows stitching two surfaces together.
Figure 27B:
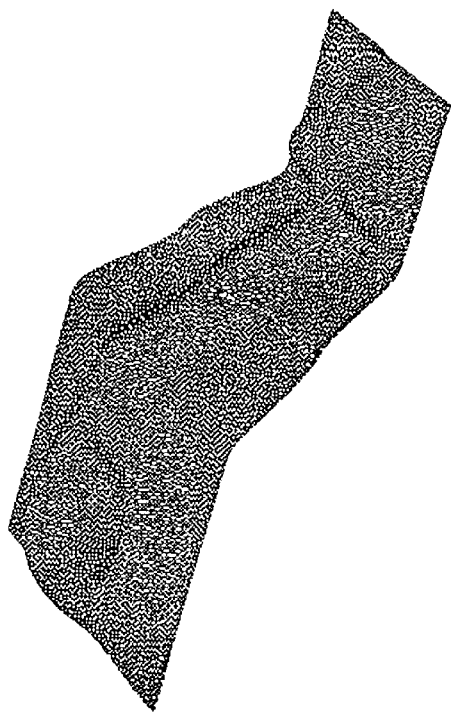
FIGS. 27a–27f depict controlling stitching parameters.
Figure 27A:
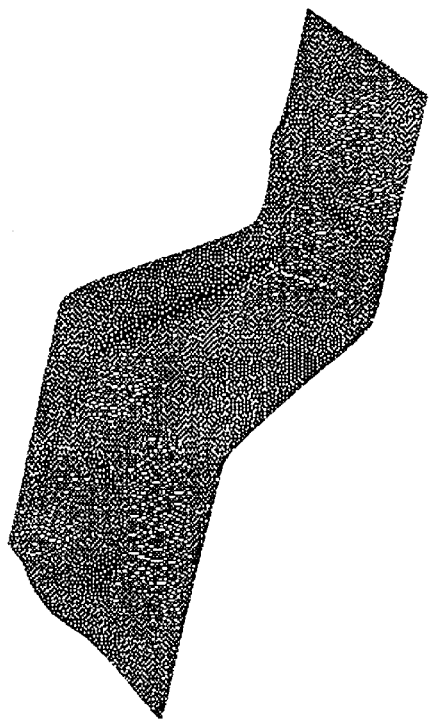
Figure 27D:
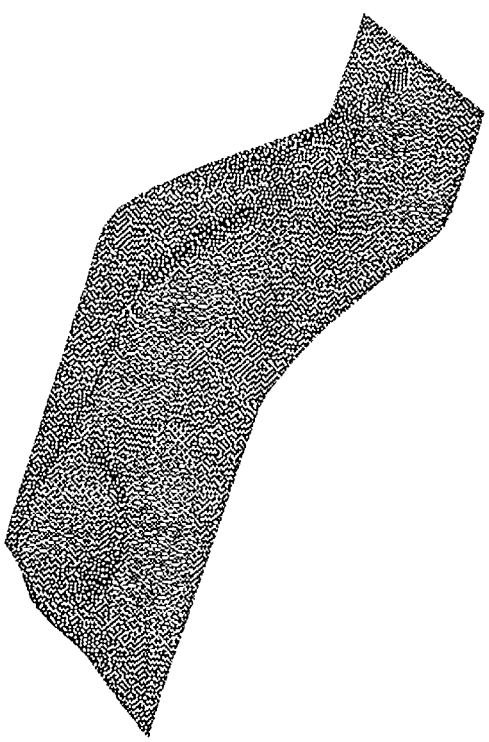
Figure 27C:
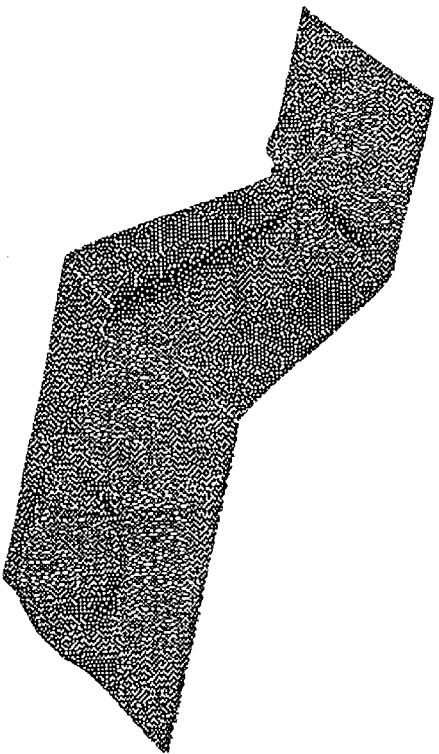
Figure 27F:
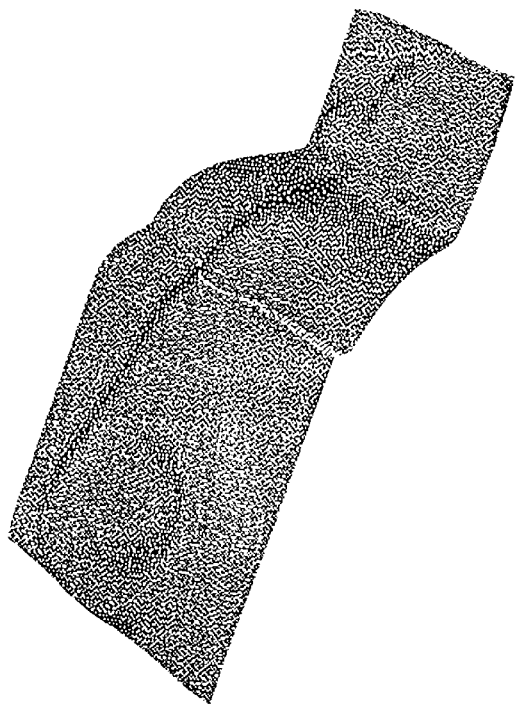
Figure 27E:
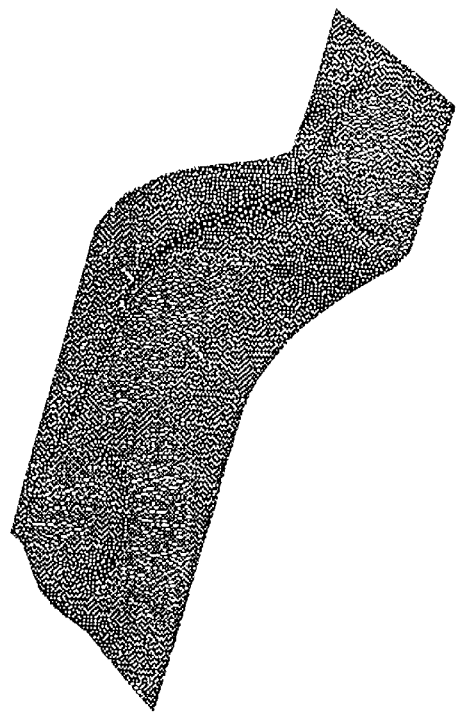
Figure 28A:
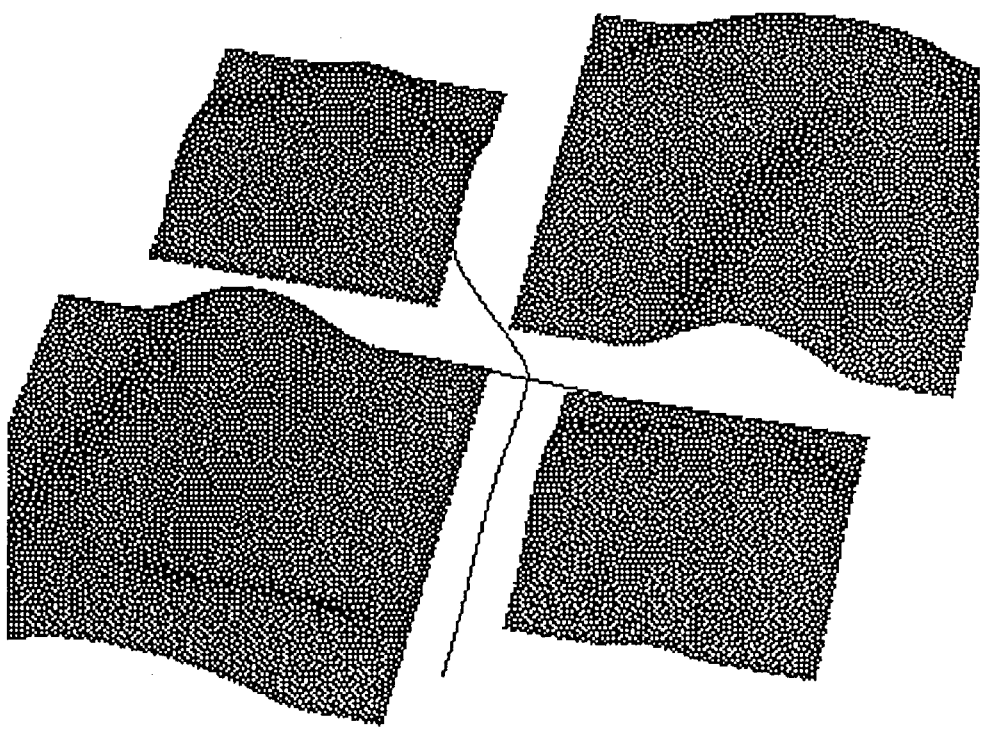
FIGS. 28a and 28b depict a four way stitch.
Figure 28B:
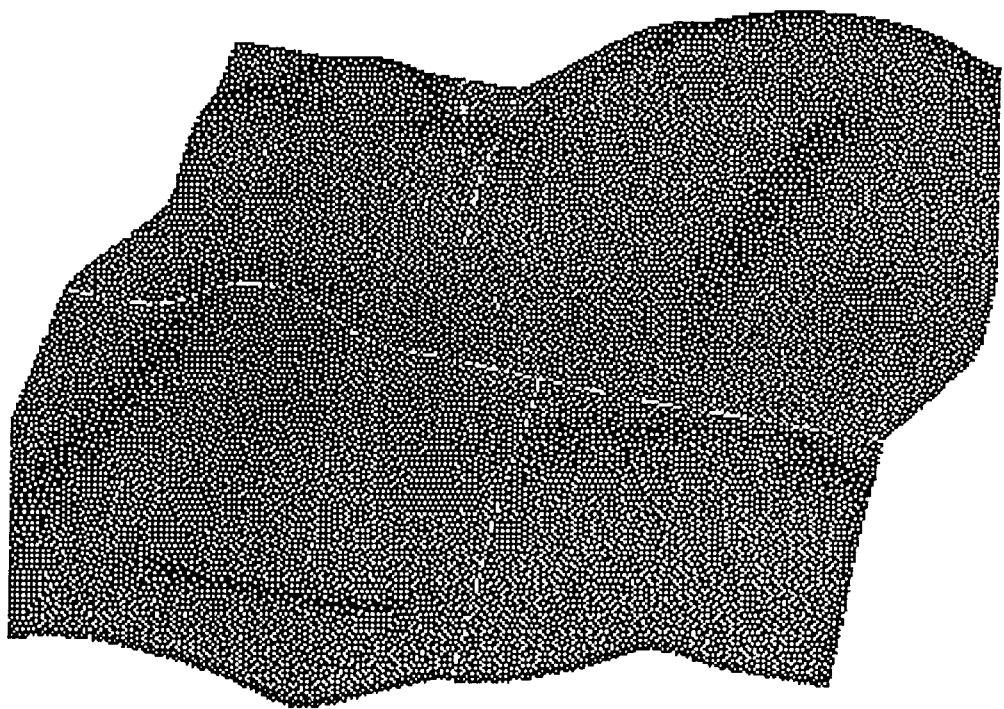

A wire-based geometry stitcher is a two step process as illustrated in FIG. 25. The first step is the creation of wire curves along the edges of the geometry to be stitched. The wire curves are then blended in a pair-wise fashion to common seams. The object surfaces track the common seam, resulting in a stitch. edge1 and edge2 form the base-wires for the blended seam feeding into wire1 and wire2 respectively. edge1 and edge2 are reparameterized to a common domain before the stitch is defined. FIG. 26a shows the setup of a simple stitch. In FIG. 26b the blend weight for the seam causes it to move edge1 to edge2. FIG. 27a shows the stitch being preserved as object1 is moved. FIGS. 27b and 27c show control over which object is deformed to preserve the stitch by varying the blend weight for the seam. The drop-off radii or region of influence r for the wires provides control over how much of each object is deformed to preserve the stitch. FIG. 27d shows the result of increasing the drop-off for object2 from the drop-off in FIG. 27c. The wire scale parameter s and the blending function f control the flow-lines or movement of geometry along the surface. FIG. 27e shows the results of increasing s from the value in FIG. 27c. Additionally, the seam is a curve that can be transformed manually if desired (see FIG. 27c). The various wire parameters not only give control over the stitch but over the tearing of the stitch through the use and animation of locators along the seam (see FIG. 27f). FIGS. 28a and 28b show the results of a four-way stitch. There are two shortcomings of the above approach. The first is that since each object is deformed independently, high orders of surface continuity across the stitch cannot be guaranteed. The control afforded by wire parameters r, s and f in particular, alleviates this to an extent. Second, seams are currently stitched pair-wise, thus imposing a stitching order, which can be restrictive.

Figure 29A:
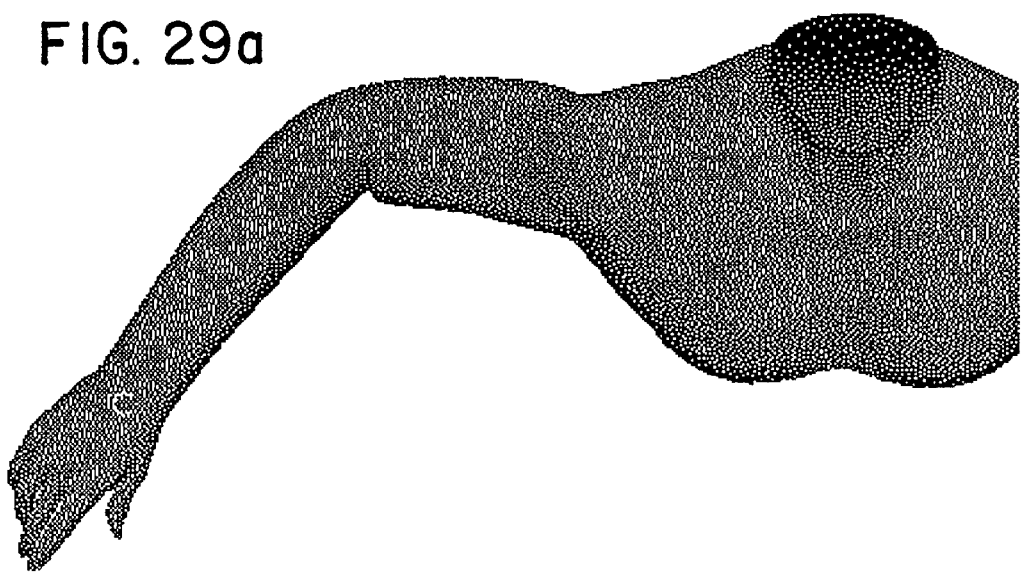
FIGS. 29a–29c depict using the invention for skeleton animation.
Figure 29B:
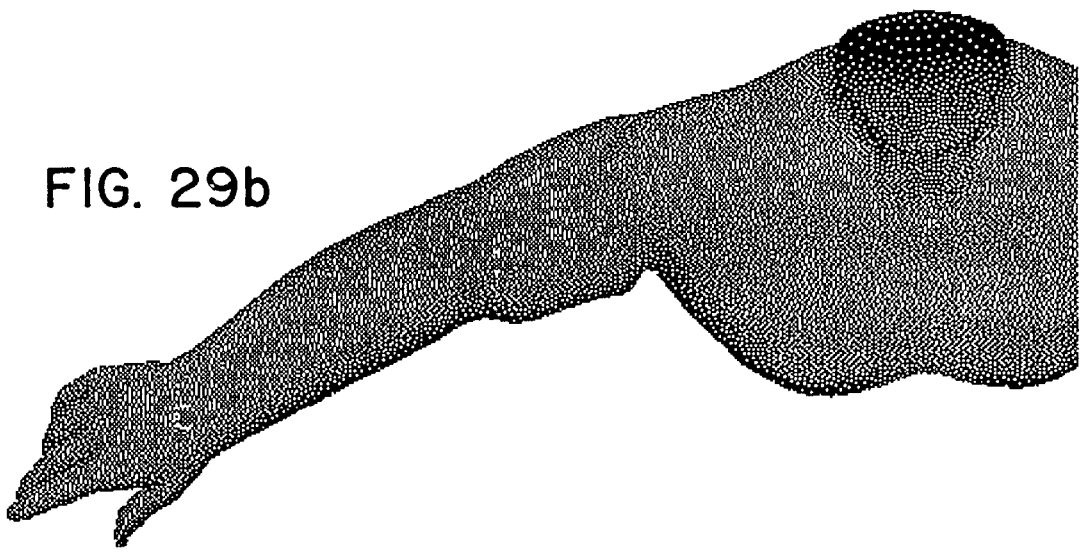
Figure 29C:
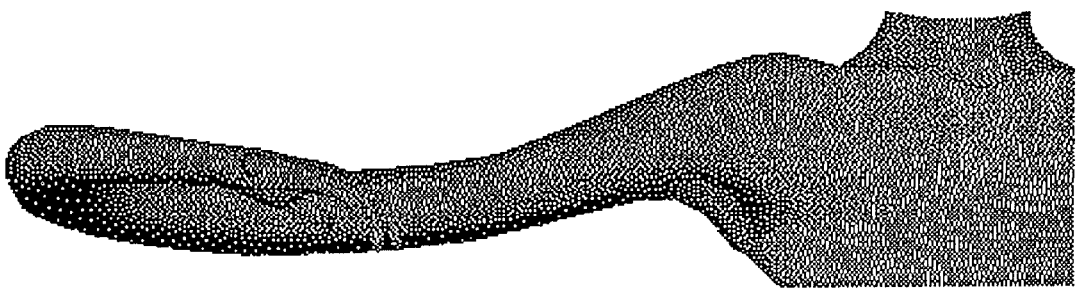

Inverse kinematics (IK) on joint chains driving attached object geometry is popular for articulated-figure animation. Most IK solvers, especially efficient single chain solvers, have a problem with segments that scale non-uniformly during animation. This is essential if, for example, an animator wishes to model a character with partially elastic bones. We replace a joint chain with a curve passing through and bound to it, so the control polygon of the curve acts like an articulated rigid body. A rubber band like behavior by transforming the control points of the curve proportionally along the joint chain based on the motion of the end effector. The result is a semi-elastic skeletal curve with a degree of elasticity. The curve then deforms the object geometry associated with the joint hierarchy as a wire. If the drop-off radius r is large we can assume that every point on the geometry will track the curve equally and precisely (see FIG. 11b). This in itself takes care of smoothing the regions around joints that often require special techniques to solve. Further, the arc-length of the curve is used to modulate the wire scale factor s, providing visually realistic volume preservation of the geometry on elastic deformations. FIGS. 29a–29c show the deformation to an arm as the kinematic solution is varied from perfectly rigid to perfectly elastic.

Figure 30:
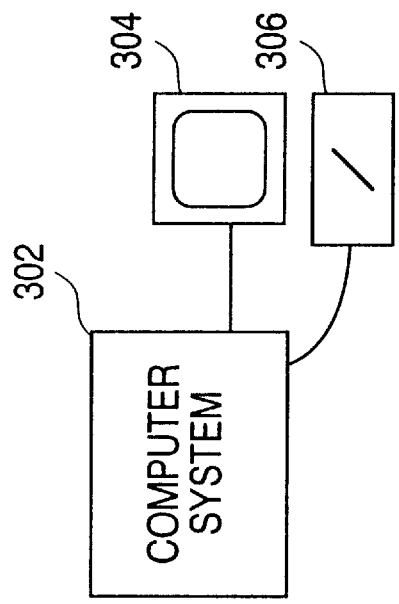
FIG. 30 depicts a system according to the present invention.

The present invention is typically implemented in a system as depicted in FIG. 30 in which a computer system 302, such as an O2 from Silicon Graphics, Inc., interact with a user through a conventional display 304 and a conventional input device 306, such as a pen/stylus and pad. The system 302 includes appropriate storage such as RAM, ROM, hard disk and floppy disk sufficient to store the processes and data structures of the invention. The process of the present invention can also be transferred over or performed over a network using the network as a medium of storage.

The present invention has been described with respect to a preferred embodiment of a geometric deformation technique, employing space curves and functions that cleanly aggregate to deform an object. The slowest part of the process described herein is the closest-point on curve calculation $R(p_R)$ for points P of the object geometry. Fortunately, as described above these values can be precomputed for each point P and must be recalculated only if the base-wire curve R is manipulated. In many applications this is not done, and as such many values such as $F(P,R)$, $R(p_R)$, $R'(p_R)$ can be precomputed; the wire deformation algorithm then reduces to a few simple vector operations per control vertex of the object geometry and is very efficient.

Multiple wire interactions can also be accumulated incrementally in one pass. Let P' be the deformed point after k−1 wires (or other deformers). The computation for the $k^{th}$ wire would be:

$$wt_0 = 0 \quad (13)$$

$$Def_0 = (0,0,0) \quad (14)$$

$$wt_k = wt_{k-1} + |\Delta P_k|^m \quad (15)$$

$$Def_k = Def_{k-1} + \Delta P_k \cdot |\Delta P_k|^m \quad (16)$$

$$P' \mathrel{+}= \frac{Def_k}{wt_k} - \frac{Def_{k-1}}{wt_{k-1}} \quad (17)$$

Figure 31:
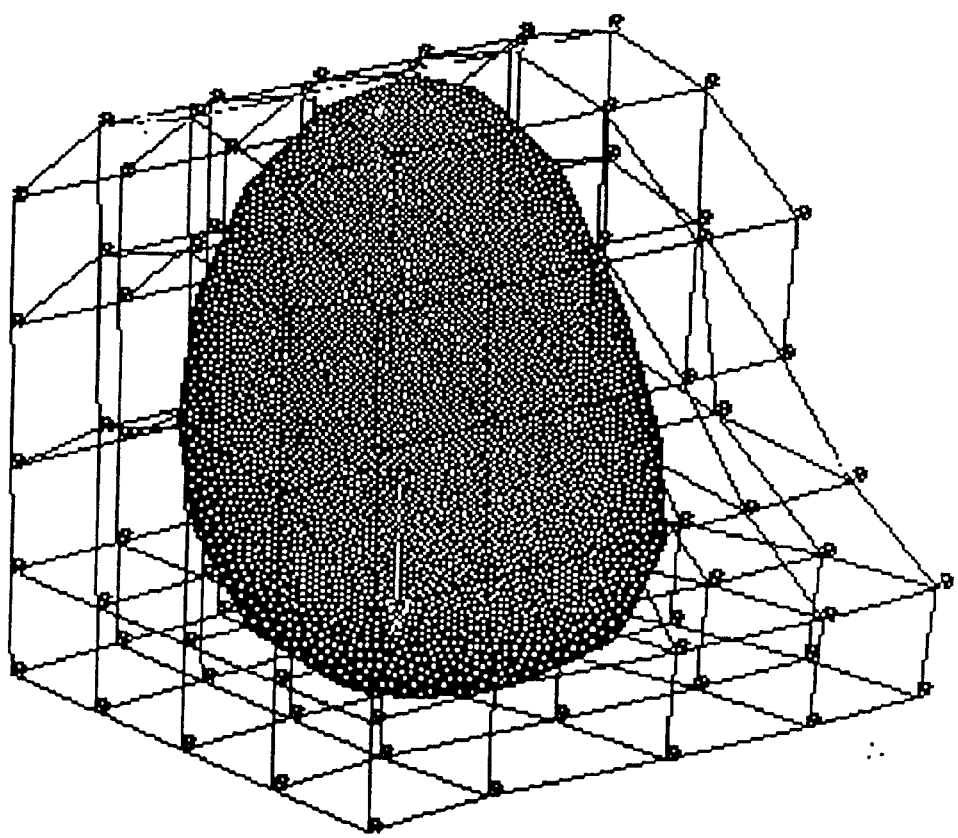
FIG. 31 illustrates lattice deformation.

Wire deformations work very well alone or in combination with existing techniques. Free form deformation (FFDs), for example, are well suited for volume-oriented deformations. Arbitrarily shaped lattices can be cumbersome to construct for finer surface-oriented deformations. Furthermore, FFD lattices usually have far more control points than wire curves for deformations of similar complexity. Wire curves can help by providing higher level control for lattice points to make complex FFD lattices more tractable (see FIG. 31). On the other hand, FIGS. 21a–21c demonstrate that wires can simulate the behavior of an FFD lattice. Wires allow one to localize the complexity of a deformation on an object, and they provide a caricature of the object being modeled. The coupling of deformation and geometry is a significant advantage of wires. It is also very easy to work in a multi-scale fashion. At the highest level a user may simply create a few wire curves, associate them with an object and move them around to verify that the object's surface properly tracks the motion of the curves. The region of the surface to be influenced can then be refined by adding curves and locators to the wires; finer-scale deformations can be added with more wires.

A useful point of comparison to the invention is "curve on surface" manipulation techniques that are found in some CAGD systems. There, least-squares techniques are used to isolate the control vertices relevant to a curve placed on or near a surface so that motion of the curve displaces the control points, which in turn changes the surface. Wires in most ways are a superior interaction technique because they are easier for a user to control, they are efficiently computed, and they apply to more general object representations. For surface patches with a low density of control points, changing a surface by deforming control points may not be as precise as a least squares solution, and it will sometimes suffer from aliasing artifacts.

Figure 32:
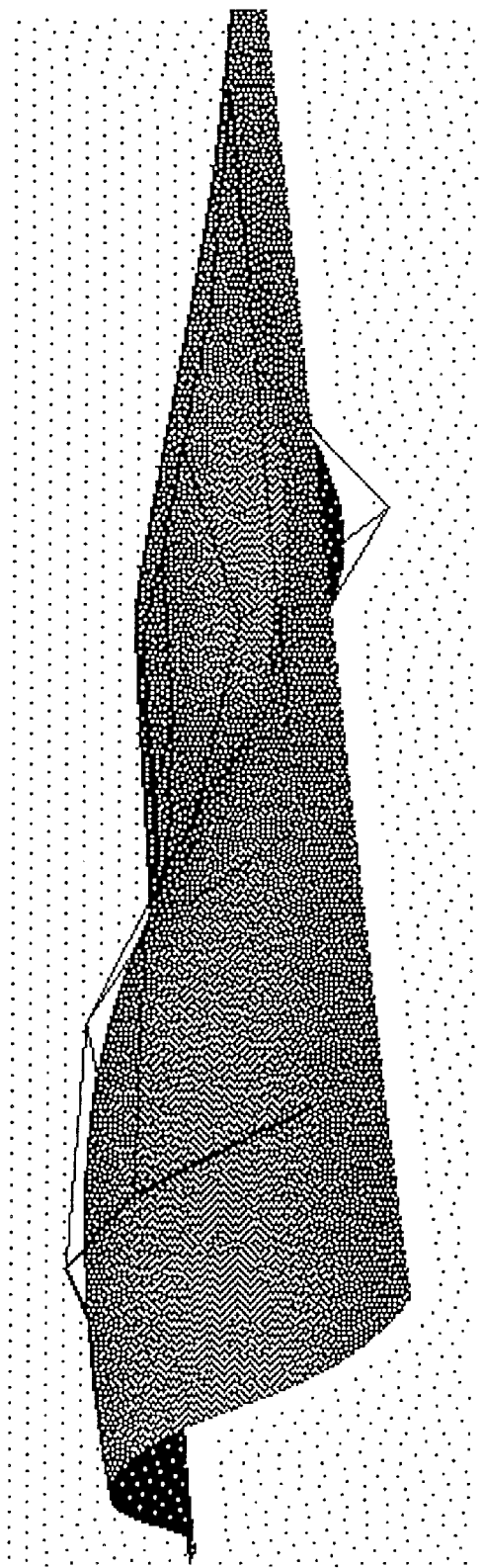
FIG. 32 illustrates using a surface as a holder.

Wires and holders can be extended to using surfaces instead of curves (see FIGS. 32a and 32b). The process described herein for combining the resulting deformations of multiple wires need not be specific to wires and may be used to combine any scalar or vector valued deformation. In the discussion herein it was noted that there may be several closest points on a curve to a point in space. In cases of wire curves with high curvature, the policy of picking the closest point with the smallest parameter value can cause singularities in the deformation. Such cases can be handled by breaking a wire curve into multiple wire curves in regions of high curvature since, as described previously, the process ensures that abutting wires do not introduce seaming or bulging artifacts. While subdivision is rarely necessary, it is worth improving our policy to see if extreme cases can be handled automatically.

The invention has been described with the curve W being surrounded by a region of influence r such that points on the object that are not in the region will not be affected. As a result, if W is positioned sufficiently far from the object such that no points of the object are within the region, no deformation will occur. It is alternatively possible to translate or project W to the surface of the object using the determined closest points and then apply the influence region. This will ensure that a curve W will always result in deformation when moved.

The invention has been described with respect to applying wires to objects to deform the objects. It is possible to take a set of wires that have been created for one object and use them to deform a different object by projecting the wires on to the object.

The present invention has been described with respect to integrating deformations to remove anomalous behavior when wires interact. However, integration is not just useful in deformation but can be used in integrating models, surfaces, vectors, scalars and displacements.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A process of deformation, comprising:
    determining whether a point of a three-dimensional object lies within a region of influence of at least two three-dimensional wire curves each having an axis; and
    changing the position of the point in three dimensions responsive to parameters of the wire curves by defining a rotation associated with the axis of each of the curves.

2. A process of deformation, comprising:
    determining whether a point of an object lies within a region of influence of at least two wire curves; and
    changing a position of the point responsive to parameters of the wire curves with the parameters comprising a parametric curve and a region of influence.

3. A process as recited in claim 2, wherein said parametric curve is a three-dimensional object surface curve.

4. A process of deformation, comprising:
    determining whether a point of an object lies within a region of influence of at least two wire curves; and
    changing a position of the point responsive to parameters of the wire curves with the parameters comprising:

a scaling parameter controlling radial scaling around said curves; and a blending function controlling a transition from a region of deformation to a region without deformation.

5. A process of deformation, comprising:

determining whether a point of an object lies within a region of influence of at least two wire curves;

changing a position of the point responsive to parameters of the wire curves; and controlling position changes responsive to a holder curve.

6. A process of deformation, comprising:

determining whether a point of an object lies within a region of influence of at least two wire curves; and changing a position of the point responsive to parameters of the wire curves by algebraically combining changes in position caused by the at least two wire curves.

7. A process of deformation, comprising:

determining whether a point of an object lies within a region of influence of a first wire curve;

changing a position of the point responsive to parameters of the first wire curve, the parameters comprising a parametric curve, a region of influence, a scaling parameter controlling radial scaling around said curve, and a blending function controlling a transition from a region of deformation to a region without deformation, the changing comprising determining an influence function for the point, scaling the position of the point responsive to the scale factor, rotating the point about a tangential axis responsive to rotational manipulation of the wire curve, and translating the point responsive to curve translation manipulation;

controlling position changes responsive to a holder curve;

performing the determining, changing and controlling with respect to a second wire curve; and algebraically combining changes in position caused by the first and second wire curves.

8. A process of combining at least two effect fields, comprising:

determining effects caused by each of the at least two fields; and creating a composite field by integration of the at least two fields.

9. A process of combining deformations of at least two wire curves, comprising:

determining deformations caused by each of the at least two wire curves; and integrating the deformations.

10. A process as recited in claim 9, wherein the integrating is controlled by a blending factor.

11. A process as recited in claim 9, wherein said integrating blends are responsive to:

$$P_{def} = P + \frac{\sum_{i=1}^{n} \Delta P_i \cdot |\Delta P_i|^m}{\sum_{i=1}^{n} |\Delta P_i|^m}$$

where $P_{def}$ is a deformed point, P is a point on an object, $\Delta P_i = P_{def_i} - P$ and m is a blending factor.

12. A system, comprising:

a model of an object;

means for deforming the model responsive to at least two wire curves, each of said wire curves comprising:

a free form curve independent of the model and associated with the model; and a region of influence associated with said wire curve.

13. A computer memory product, comprising:

a computer readable memory;

an object model stored in said memory; and at least two wire curves stored in said memory and each of said at least two wire curves defining a directly manipulable deformation primitive for the model and representing a surface of the model.

14. A product as recited in claim 13, wherein said wire curve is independent of the model.

15. A computer memory product, comprising:

a computer readable memory;

an object model stored in said memory; and at least two wire curves stored in said memory and each of said at least two wire curves defining a deformation of said model and comprising:

a free-form curve associated with said model and controlling deformation of said model; and a region of deformation influence surrounding the parametric curve.

16. A product as recited in claim 15, wherein said free-form curve comprises a parametric curve and said wire curve further comprises a scaling parameter controlling radial scaling around said curve.

17. A product as recited in claim 15, wherein said wire curve further comprises a blending function controlling a transition from said region of deformation to a region without deformation.

18. A product as recited in claim 15, further comprising a holder curve stored in said memory, associated with said model and demarking a region of said model influenced by said wire curve.

19. A product as recited in claim 18, wherein said holder curve provides control between said wire curve and said holder curve.

20. A product as recited in claim 15, further comprising a locator stored in said memory, associated with said wire curve and specifying a parameter value for said wire curve at a specified location.

21. A product as recited in claim 18, wherein memory store plural locators between which interpolation occurs.

* * * * *

UNITED STATES PATENT AND TRADEMARK OFFICE
CERTIFICATE OF CORRECTION

PATENT NO.    : 6,204,860 B1
DATED         : March 20, 2001
INVENTOR(S)   : Karan Sher Singh It is certified that error appears in the above-identified patent and that said Letters Patent is hereby corrected as shown below:

Title page,
Item [56], add the following:
-- OTHER PUBLICATIONS
Alan H. Barr, "GLOBAL AND LOCAL DEFORMATIONS OF SOLID PRIMITIVES", Computer Graphics, Vol. 18, No. 3, July 1984, pp. 21-30.
Nadia Magnenat Thalmann et al, "TECHNIQUES FOR CLOTH ANIMATION", New Trends in Animation and Visualization, 1991, Chapter 17.
Jules Bloomenthal et al., "CONVOLUTION SURFACES,", Computer Graphics, Vol. 25, No. 4, July 1991, pp. 251-256.
Sabine Coquillart, "EXTENDED FREE-FORM DEFORMATION: A SCULPUTURING TOOL FOR 3D GEOMETRIC MODELING", Computer Graphics, Vol. 24, No. 4, August 1990, pp. 187-196.
Marie-Paul Gascuel, "AN IMPLICIT FORMULATION FOR PRECISE CONTACT MODELING BETWEEN FLEXIBLE SOLIDS", Computer Graphics Proceedings, Annual Conference Series, 1993, pp. 313-320.
William M. Hsu, "DIRECT MANIPULATION OF FREE-FORM DEFORMATIONS", Computer Graphics, Vol. 26, No. 2, July 1992, pp. 177-184.
Francis Lazarus et al., "AXIAL DEFORMATIONS: AN INTUITIVE DEFORMATION TECHNIQUE", Computer Aided Design, Vol. 26, No. 8, pp. 607-613, August 1994.

Column 4,
Line 5, after "wires" insert -- 10 --.

Signed and Sealed this

Eleventh Day of June, 2002

Attest:

Attesting Officer

JAMES E. ROGAN
Director of the United States Patent and Trademark Office